Sept. 2, 1930.  J. B. ARMITAGE  1,774,692
METAL WORKING MACHINE
Filed Dec. 14, 1925    14 Sheets-Sheet 1

INVENTOR
Joseph B Armitage
BY
Fred G Parsons
ATTORNEY

Sept. 2, 1930.  J. B. ARMITAGE  1,774,692
METAL WORKING MACHINE
Filed Dec. 14, 1925  14 Sheets-Sheet 2

INVENTOR
Joseph B Armitage
BY
Fred G Parsons
ATTORNEY

Sept. 2, 1930.  J. B. ARMITAGE  1,774,692
METAL WORKING MACHINE
Filed Dec. 14, 1925  14 Sheets-Sheet 3

INVENTOR
Joseph B Armitage
BY
Fred G Parsons
ATTORNEY

Sept. 2, 1930.  J. B. ARMITAGE  1,774,692
METAL WORKING MACHINE
Filed Dec. 14, 1925  14 Sheets-Sheet 4
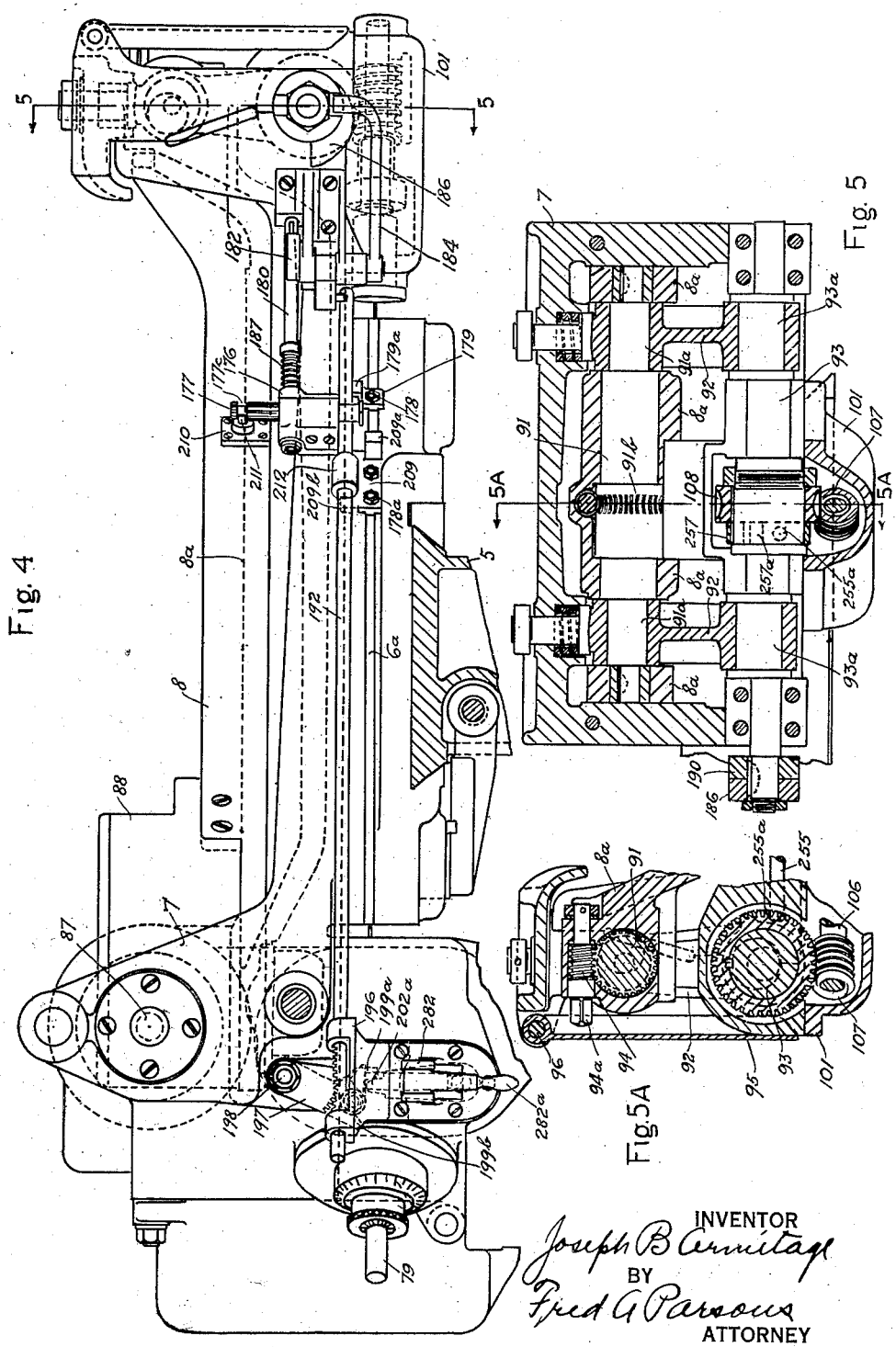
INVENTOR
Joseph B Armitage
BY
Fred G Parsons
ATTORNEY

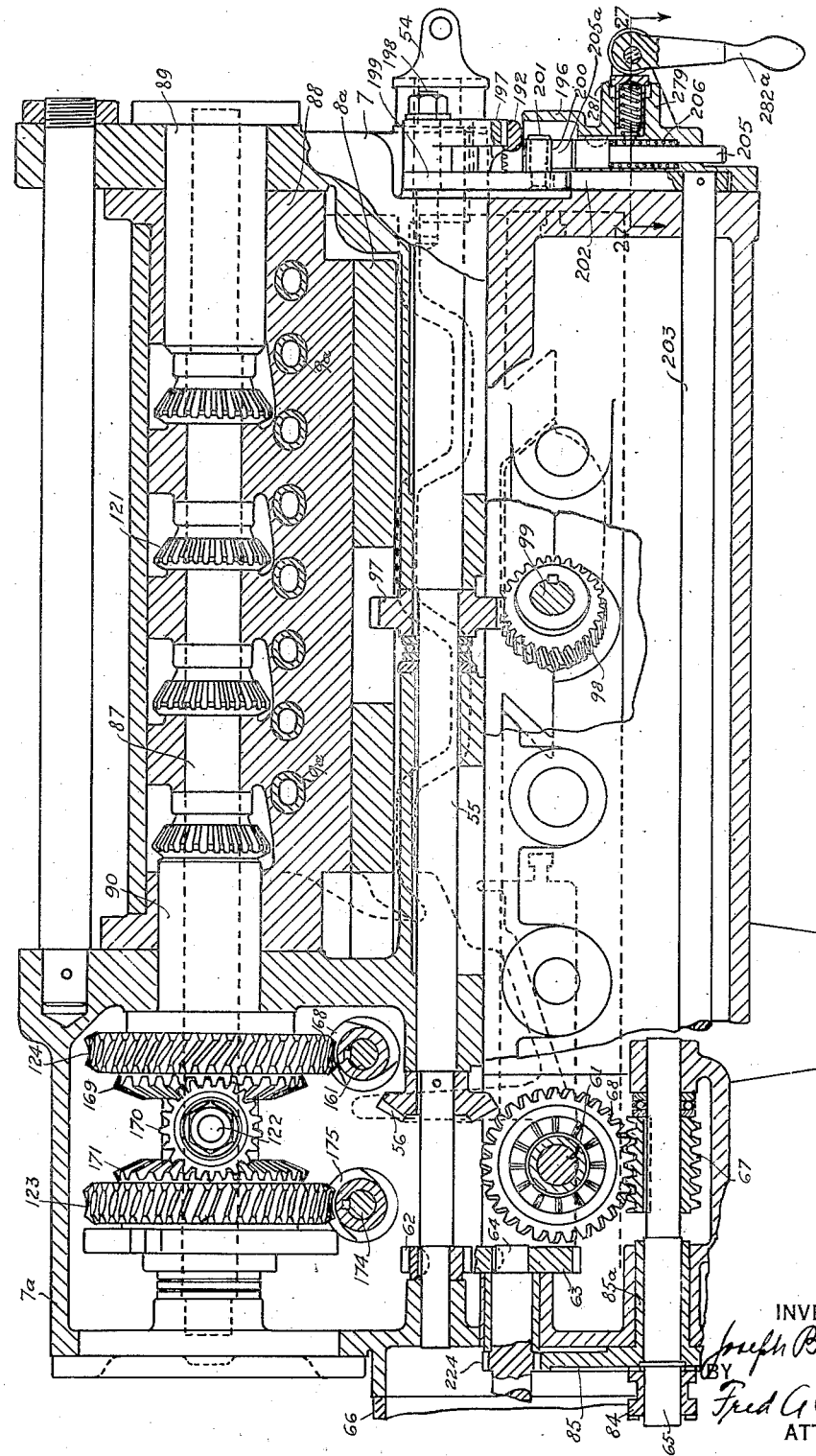

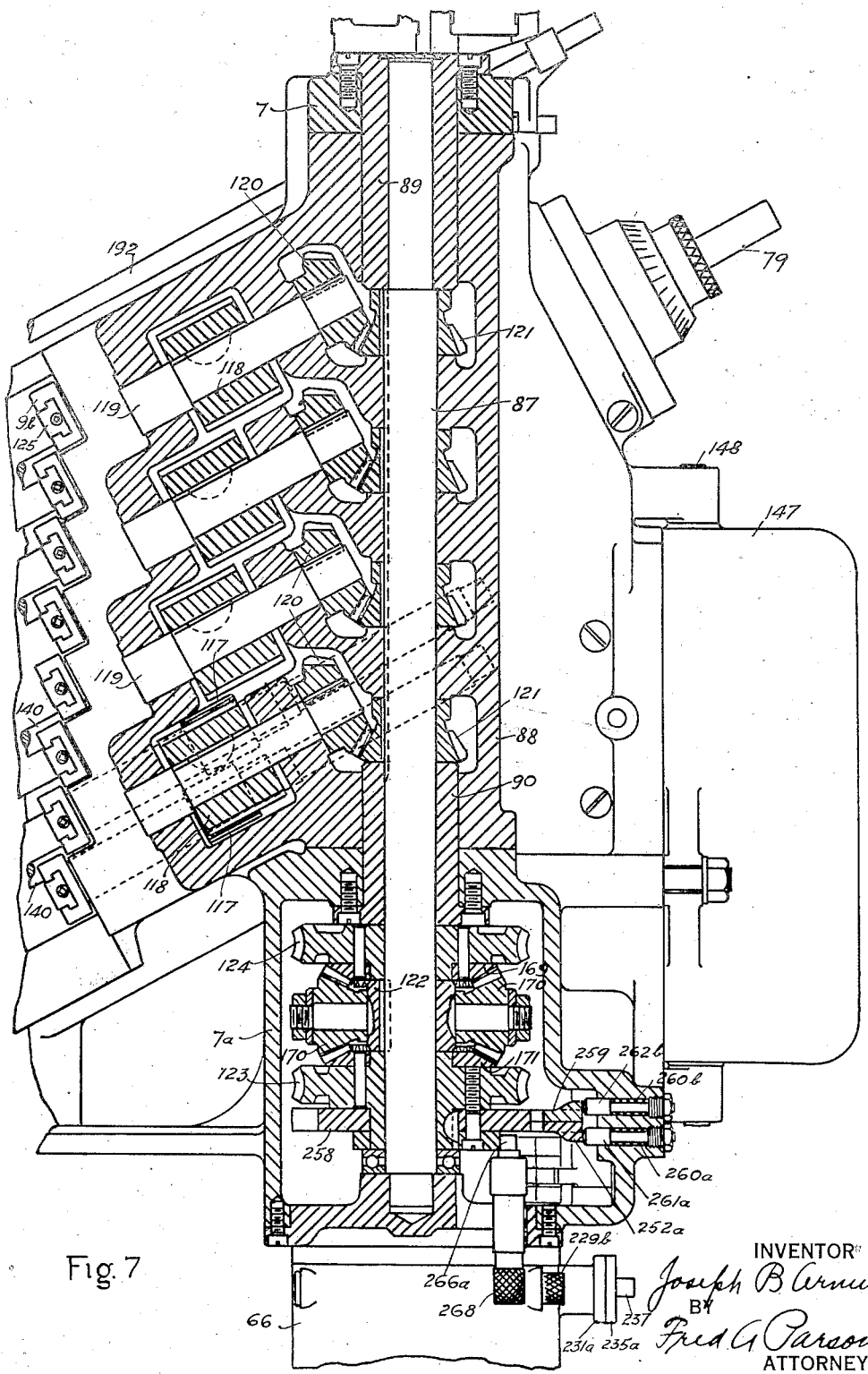

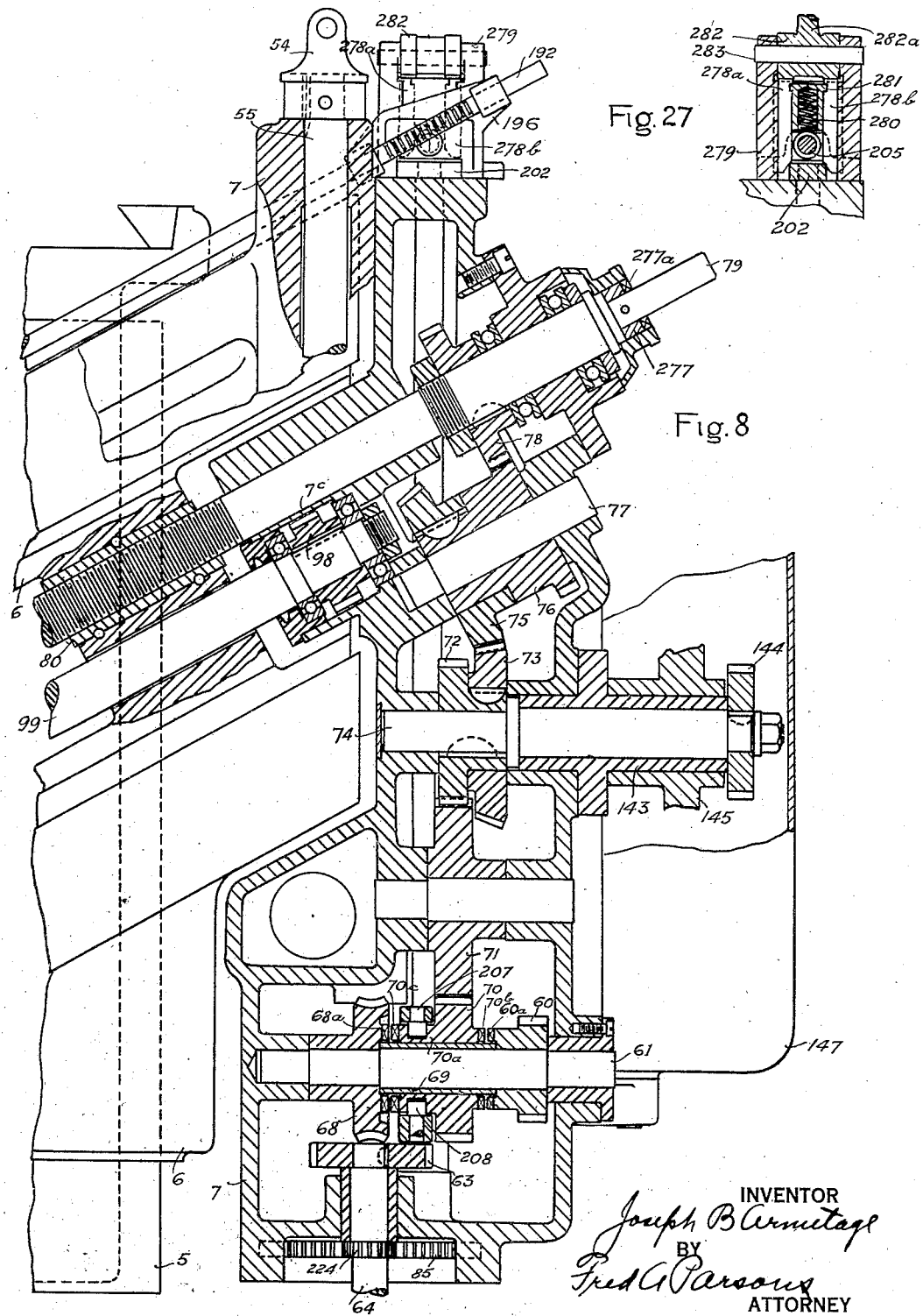

Sept. 2, 1930.  J. B. ARMITAGE  1,774,692
METAL WORKING MACHINE
Filed Dec. 14, 1925  14 Sheets-Sheet 8
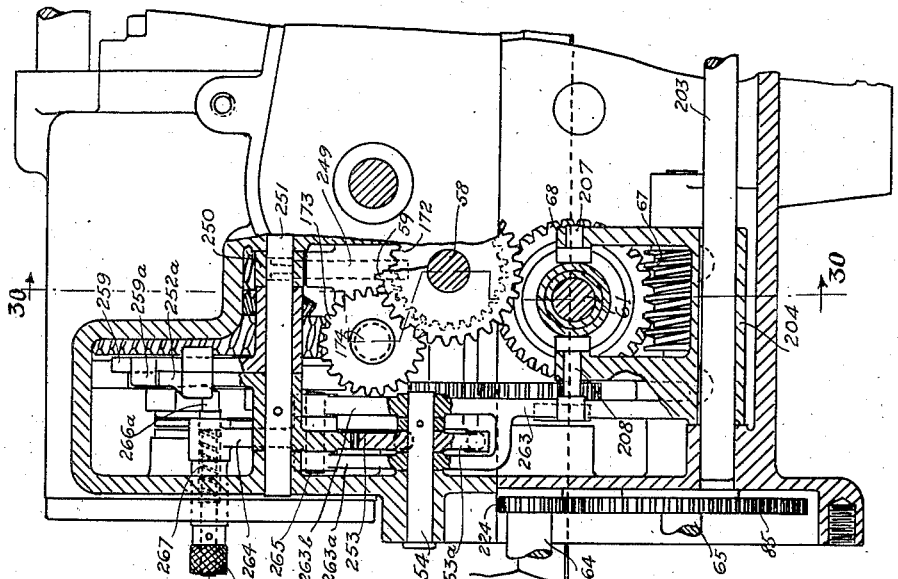
Fig. 10
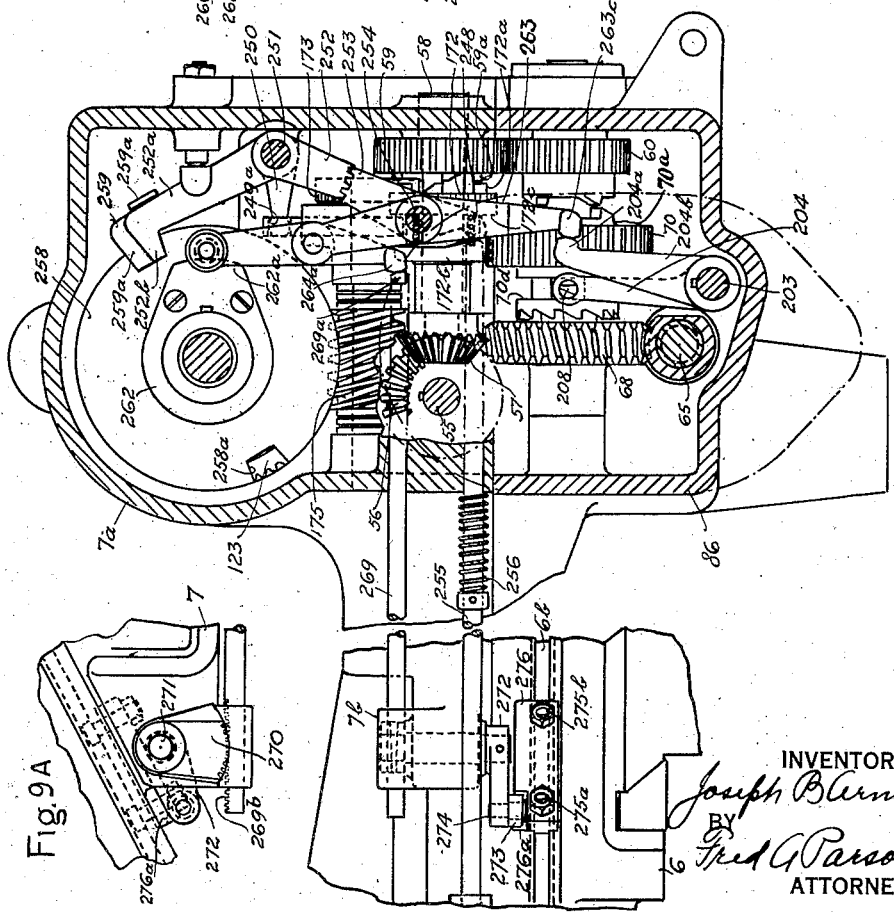
Fig. 9
Fig. 9A
INVENTOR
Joseph B Armitage
BY
Fred G Parsons
ATTORNEY

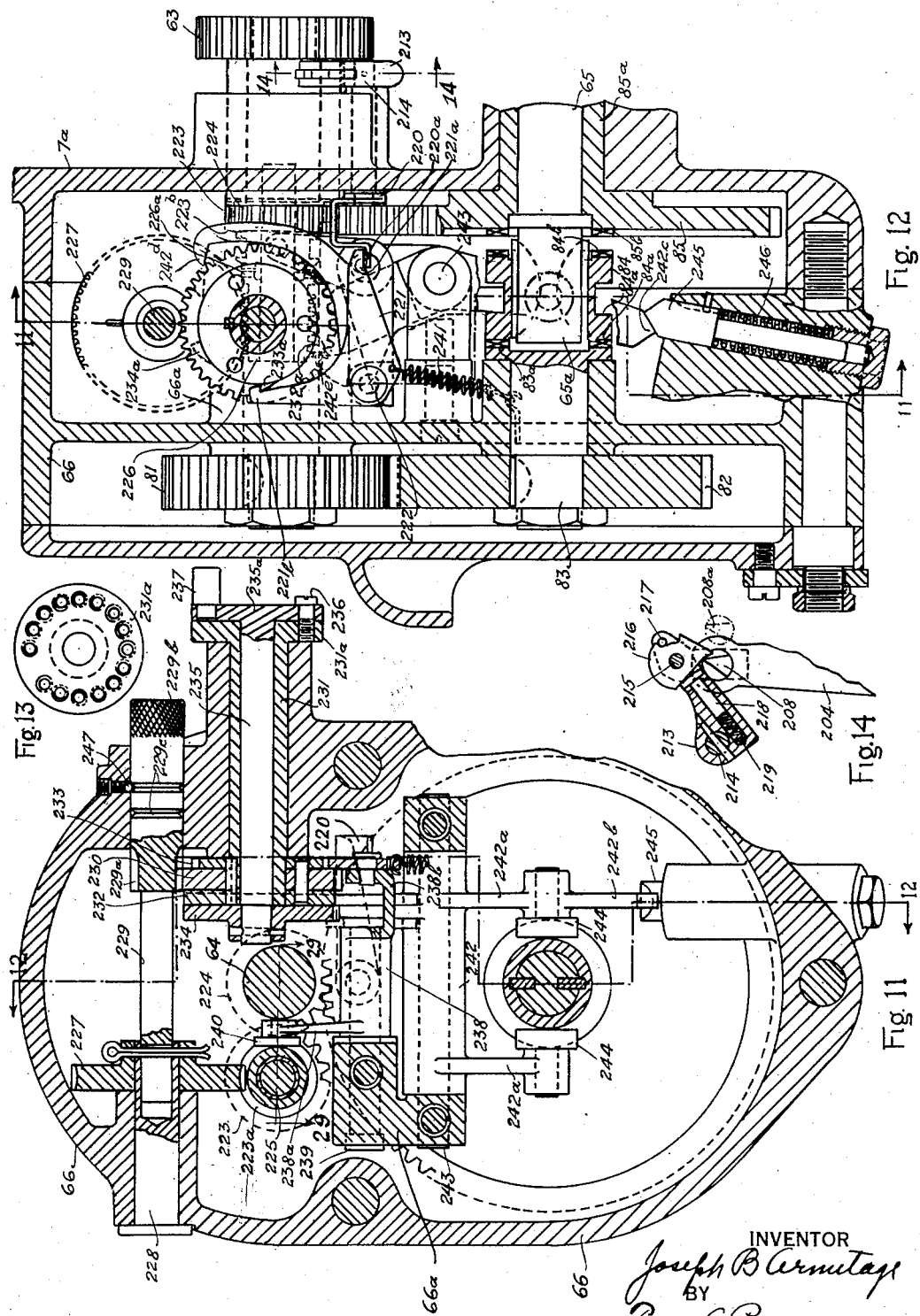

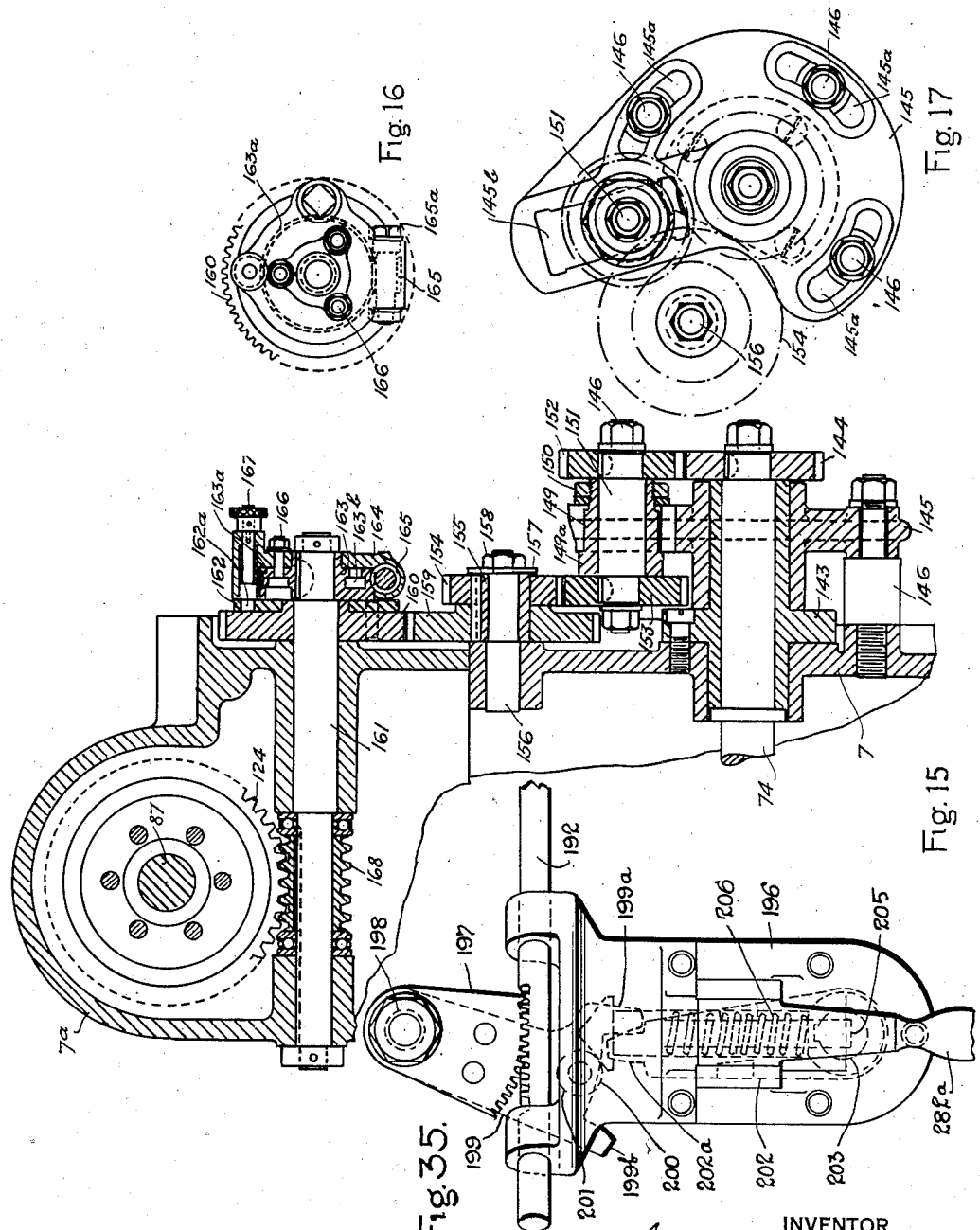

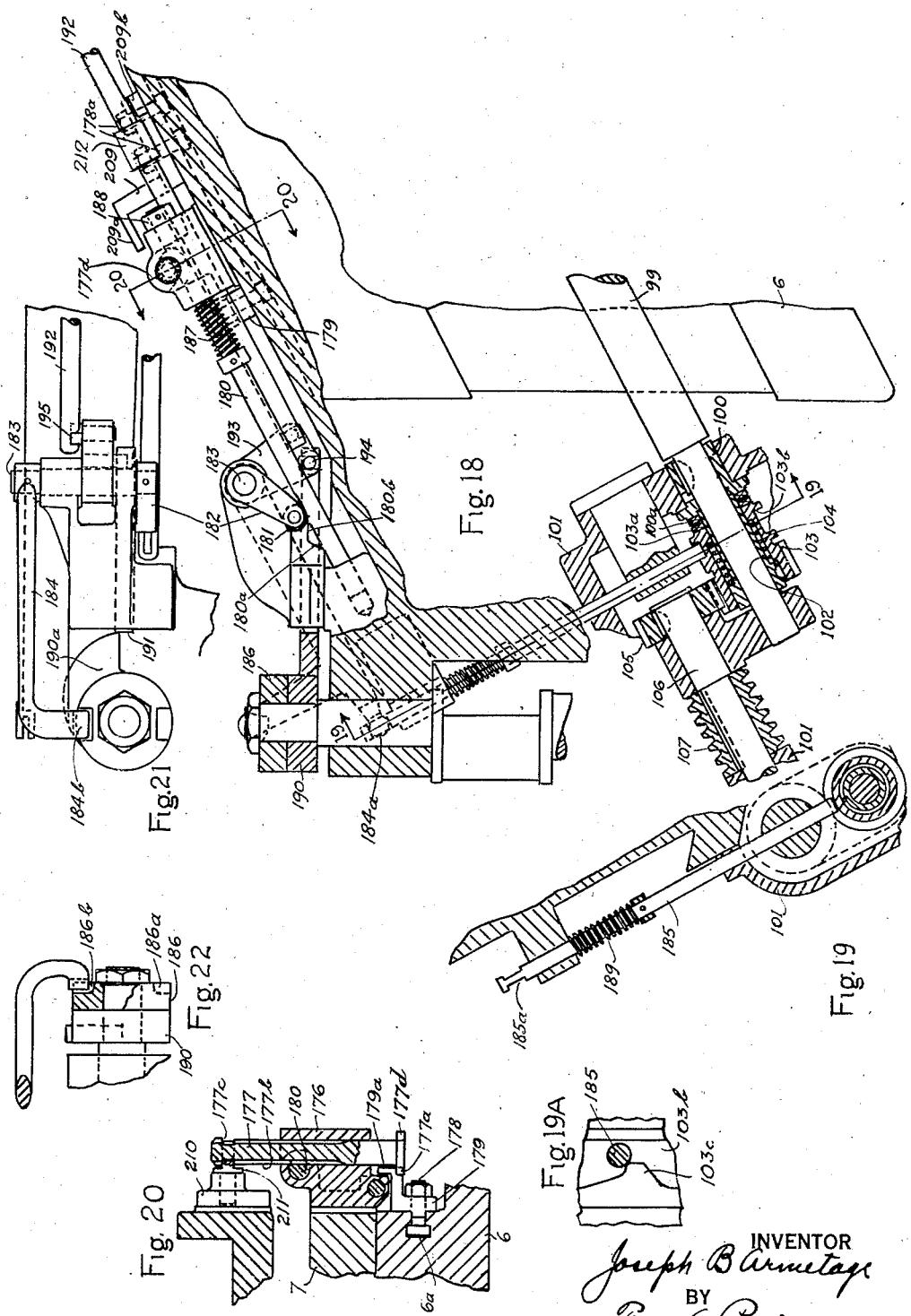

Sept. 2, 1930. J. B. ARMITAGE 1,774,692
METAL WORKING MACHINE
Filed Dec. 14, 1925 14 Sheets-Sheet 12
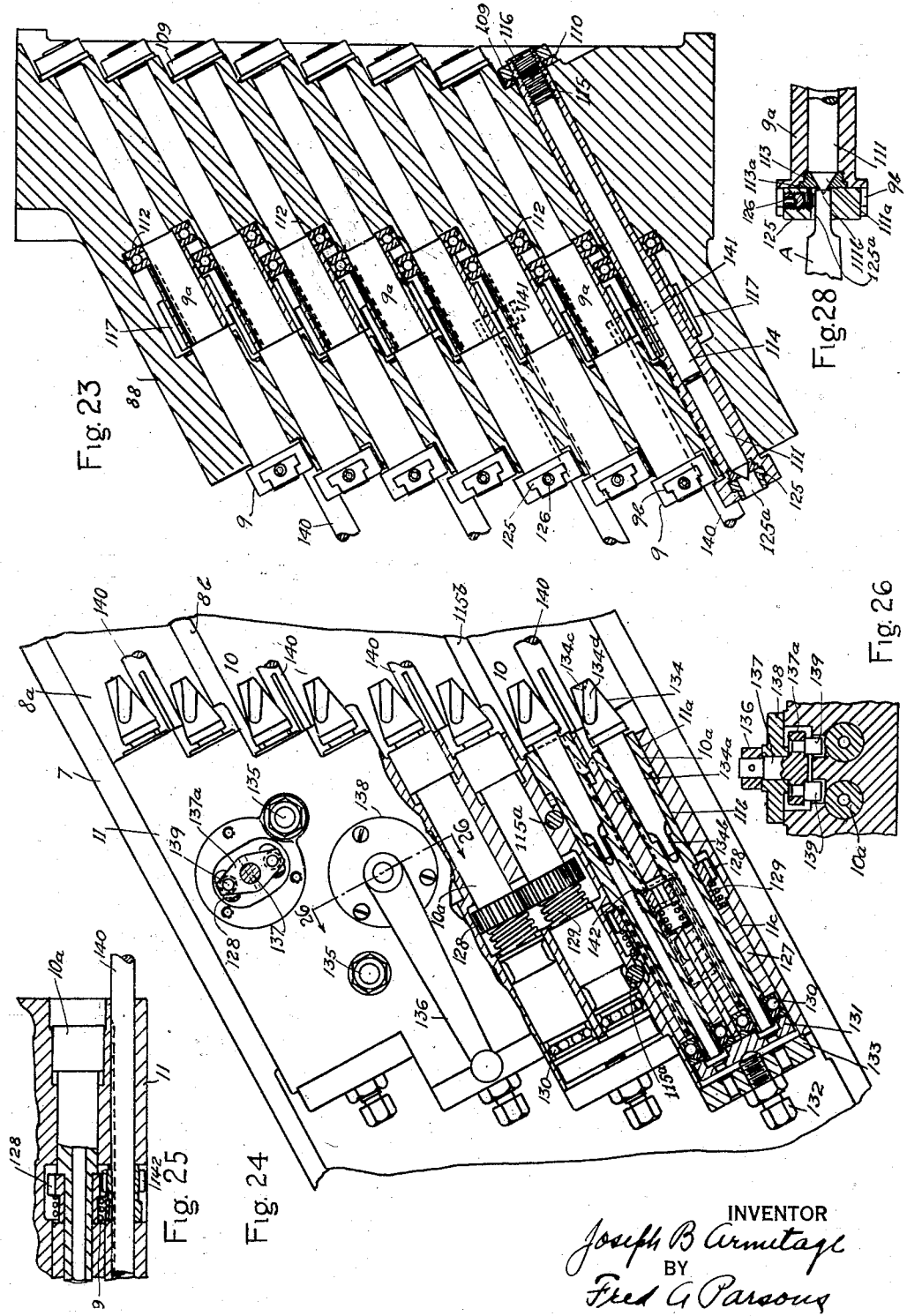
INVENTOR
Joseph B Armitage
BY
Fred G Parsons
ATTORNEY Sept. 2, 1930.  J. B. ARMITAGE  1,774,692
METAL WORKING MACHINE
Filed Dec. 14, 1925   14 Sheets-Sheet 13

INVENTOR
Joseph B Armitage
BY
Fred G Parsons
ATTORNEY

Sept. 2, 1930.    J. B. ARMITAGE    1,774,692
METAL WORKING MACHINE
Filed Dec. 14, 1925    14 Sheets-Sheet 14

INVENTOR
Joseph B Armitage
BY
Fred G Parsons
ATTORNEY

Patented Sept. 2, 1930

1,774,692

UNITED STATES PATENT OFFICE

JOSEPH B. ARMITAGE, OF MILWAUKEE, WISCONSIN, ASSIGNOR TO KEARNEY & TRECKER CORPORATION, OF WEST ALLIS, WISCONSIN, A CORPORATION OF WISCONSIN

METAL-WORKING MACHINE

Application filed December 14, 1925. Serial No. 75,265.

This invention relates generally to machine tools and more particularly to milling machines.

It is an object of this invention to devise a machine capable of simultaneously milling grooves or flutes in a number of different work pieces whereby the productive capacity of the machine is greatly increased without a corresponding increase of the mechanism required and to provide control mechanism therefor, whereby the duties of the operator are limited to replacement of the work pieces, thus greatly increasing the number of machines which an operator may attend.

Another object is to devise a machine capable of producing a number of grooves or flutes in the same piece of work, one after another, accurately spaced and positioned, by the means of mechanism which is self-controlled and capable of operating simultaneously upon a number of work pieces.

Another object is to devise a machine such as described above, in which work pieces previously milled with either one or several grooves of a certain form, may be later replaced accurately in the same machine and one or several grooves of the same or another form may be milled in a certain desired position relative to the first milled grooves.

Another object is to provide an improved machine adapted for the milling of helical grooves such for instance as the grooves of twist drills.

Another object is to provide a slow feed mechanism in addition to the normal feed mechanism, and control mechanism therefor, whereby it may be available for use at the beginning of each feed movement if required, and if in use may be adjusted to operate for a longer or shorter interval.

Another object relates to a drop table mechanism, that is to say mechanism for movement of the work pieces to a cutting position or plane of movement throughout the feed or cutting stroke and for subsequently moving them to a different plane of movement for the return travel.

Another object is to combine a drop table mechanism with mechanism for altering the relative depth of cut at the opposite ends of a work piece, whereby grooves may be cut either having equal depth or having a predetermined difference in the depth at different portions of the groove, and whereby in combination with other features of the mechanism disclosed, twist drills may be milled having a predetermined difference in the thickness of the web at different points in the length.

Another object relates to indexing mechanism and to indexing mechanism in combination with drop table mechanism, and to control mechanism therefor whereby the indexing of the work pieces may take place during the period when the work is in the return stroke plane of movement.

Other objects are generally to simplify and improve the construction and operation and to increase the productive capacity, of a machine and the specific mechanism thereof for the accomplishment of the above mentioned objects and other objects which will be apparent from the accompanying drawings, description and claims.

In the drawings, like reference characters indicate the same parts in each of the several views in which:

Fig. 4 is a rear view of the work supports and associated control mechanism taken along a line 4—4 of Fig. 3 and enlarged.

Fig. 5 is a sectional elevation along line 5—5 of Fig. 4 and also along line 5—5 of Fig. 3 and enlarged.

Fig. 5A is a section along line 5ª—5ª of Fig. 5.

Fig. 6 is a sectional elevation mainly along line 6—6 of Fig. 2 and enlarged, the lower right hand portion however being a section along a somewhat different line a trifle to the right of line 6—6 of Fig. 2 to illustrate a portion of the control mechanism as will be later described.

Fig. 7 is an enlarged horizontal partial section along line 7—7 of Fig. 1.

Fig. 8 is an enlarged horizontal partial section along line 8—8 of Fig. 1.

Fig. 9 is a partial vertical section along line 9—9 of Fig. 1 and enlarged.

Fig. 9A is a top or plan view of a portion of the mechanism shown in Fig. 9 as will be later described.

Fig. 10 is a partial vertical section along line 10—10 of Fig. 2 and enlarged.

Fig. 11 is a vertical section approximately along line 11—11 of Fig. 1 enlarged and more exactly along line 11—11 of Fig. 12.

Fig. 12 is a cross section through automatic feed change gear case along line 12—12 of Fig. 11.

Fig. 13 is an end view of a portion of the mechanism shown in Fig. 11.

Fig. 14 is a section through a trigger arm shown in Fig. 12 along line 14—14 of Fig. 12, and also shows the end of a lever arm 204 from Fig. 9, with which the trigger arm is associated.

Fig. 15 is a developed section through a driving train as will be later described.

Fig. 16 is an end view of adjusting worm and case shown in Fig. 15.

Fig. 17 is an end view of a change gear bracket shown in Fig. 15.

Fig. 18 is a top view of a portion of the control trips and some of the associated mechanism, being in part a partial section at the rear along line 18—18 of Fig. 2 and in part a partial section along line 18ª—18ª of Fig. 2.

Fig. 19 is a partial section through the mechanism along line 19—19 of Fig. 18.

Fig. 19A is a portion of a cam groove in one of the clutch devices.

Fig. 20 is a partial section through the mechanism along line 20—20 of Fig. 18.

Fig. 21 is a projected view of a portion of the mechanism shown in Fig. 18.

Fig. 22 is a projected view of a portion of the mechanism shown in Fig. 21.

Fig. 23 is a partial horizontal section through the headstock along line 23—23 of Fig. 2.

Fig. 24 is partly a top view, partly in horizontal section through the tailstock along line 24—24 of Fig. 2.

Fig. 25 is a developed sectional portion of one of the tailstock spindles and its drive shaft.

Fig. 26 is a vertical section along line 26—26 of Fig. 24 showing mechanism for withdrawing the tailstock spindles.

Fig. 27 is a partial section along line 27—27 of Fig. 6.

Fig. 28 is an enlarged section through the work holding end of one of the head centers showing an equalizing driver for a particular type of work piece.

Figure 1:
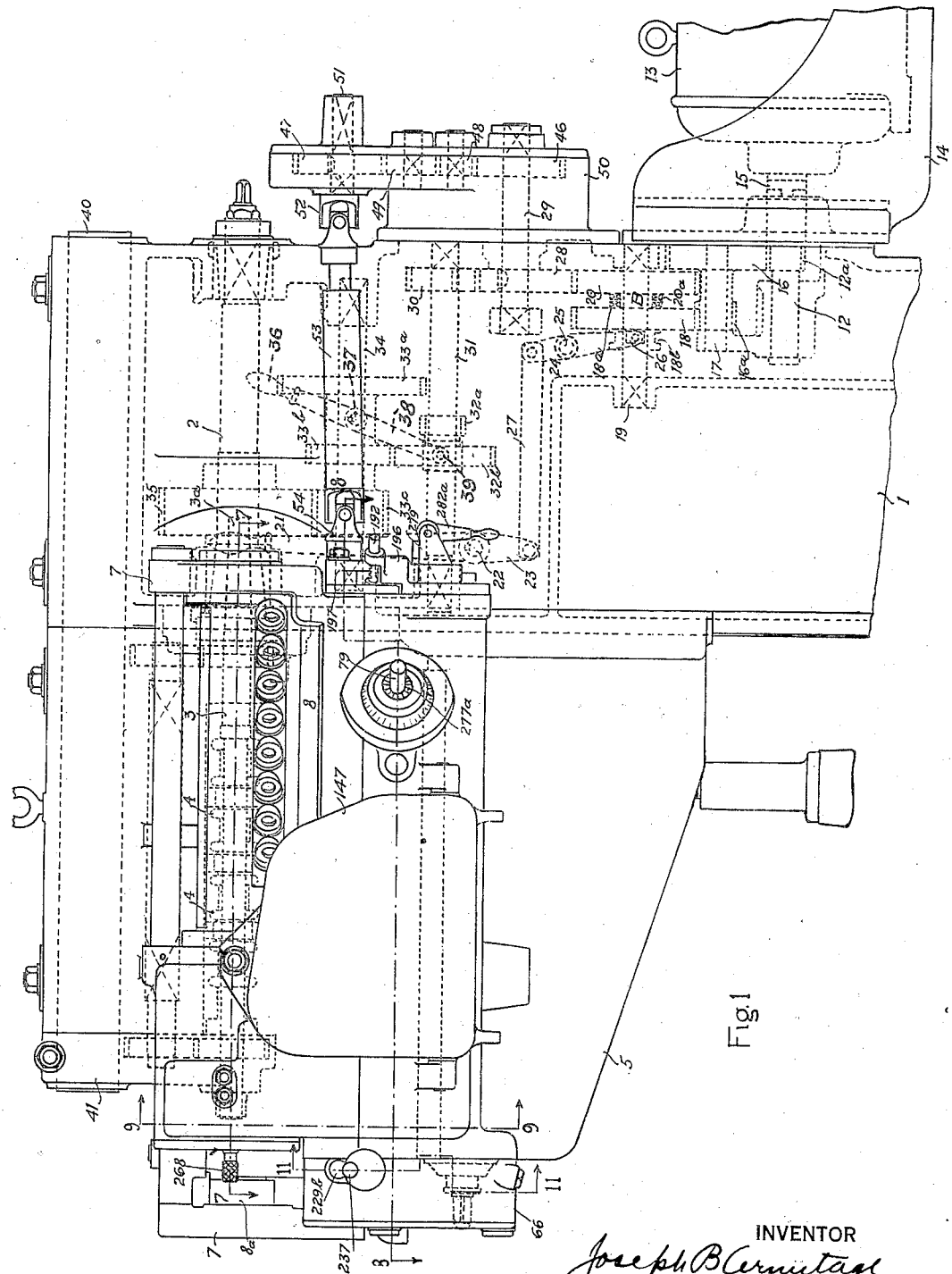
Fig. 1 is a partial side elevation of a milling machine embodying the invention, the view being taken from the right. To the left of Fig. 1 is considered the front of the machine, the operator's position being to the left of Fig. 1 and facing the machine.

Figs. 31—32—33—34 show in detail the form and association of certain parts also shown in Figs. 11 and 12.

Fig. 35 is an enlarged view of a portion of Fig. 4.

A column or main support 1 rotatably supports the tool driving spindle 2 together with its driving mechanism. Projecting from spindle 2 and driven thereby is a cutter arbor 3 upon which are mounted a number of cutters 4. Column 1 also slidably supports a knee or support 5 vertically adjustable thereon, and upon which is slidably mounted a saddle or work support 6 for adjustment toward and from the column 1. Saddle 6 is provided with a guide-way or slide in which a work support 7 may reciprocate in a path of movement disposed at an angle to the axis of arbor 3, the angle being indicated by the general arrangement of the parts in Fig. 3. Pivoted in suitable trunnions for oscillation or swinging movement relative to the support 7 is a support generally denoted by the numeral 8, a section along the trunnion or pivot being shown in Fig. 7. A number of head spindles each generally denoted by the numerals 9, Fig. 3, are rotatably supported from the support 8 but fixed against axial movement, and a number of tail spindles each generally denoted by the numeral 10, Fig. 3, are rotatably supported in a tailstock 11, adjustable on support 8 and have a limited individual adjustment for securing the work pieces between the head and tail centers.

*General description of the machine*

Figure 3:
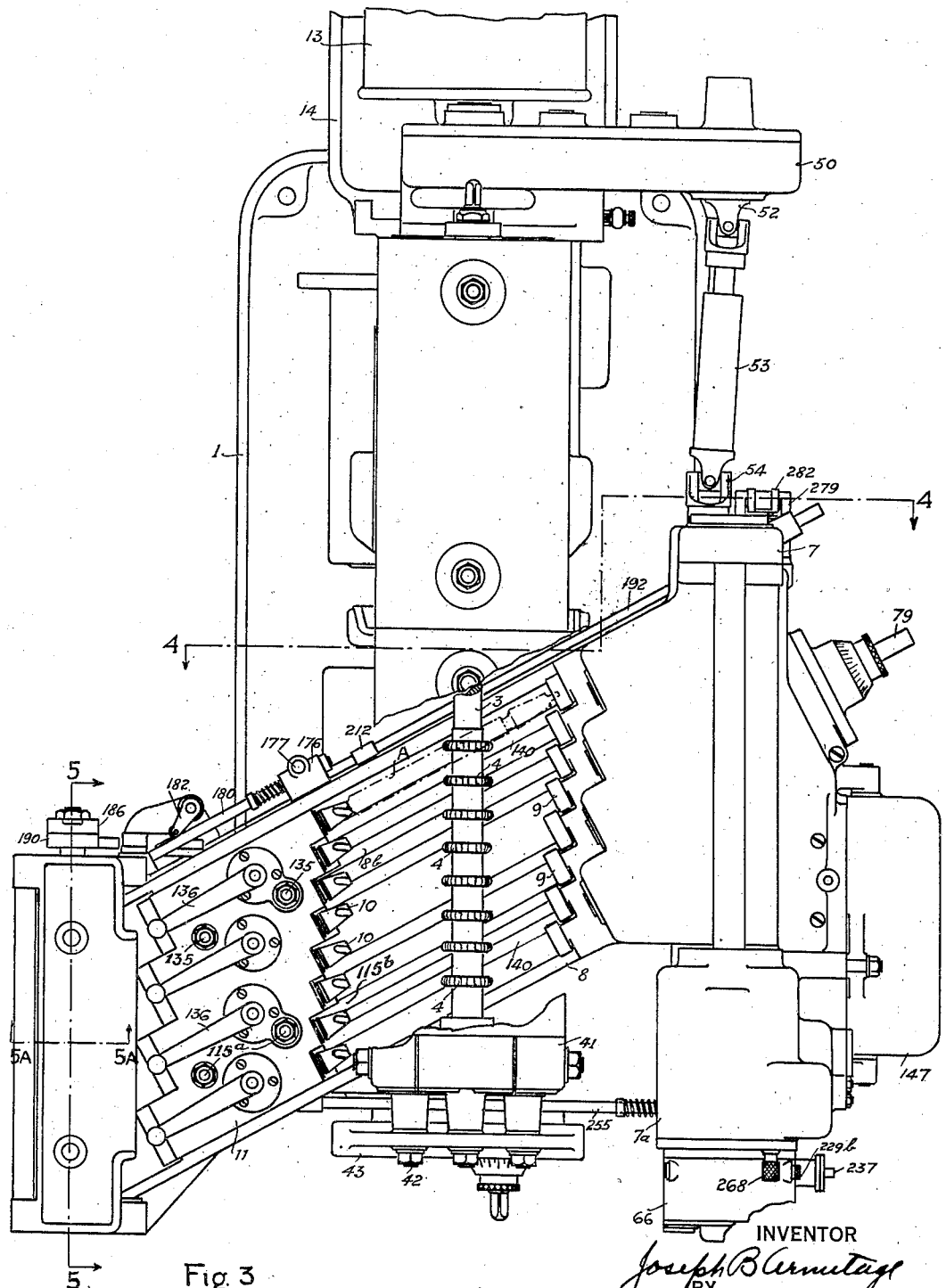
Fig. 3 is a top or plan view of the complete machine except that a part of the driving motor is broken away, and the upper support for the cutter arbor is largely broken away to show the cutters.
Figure 29:
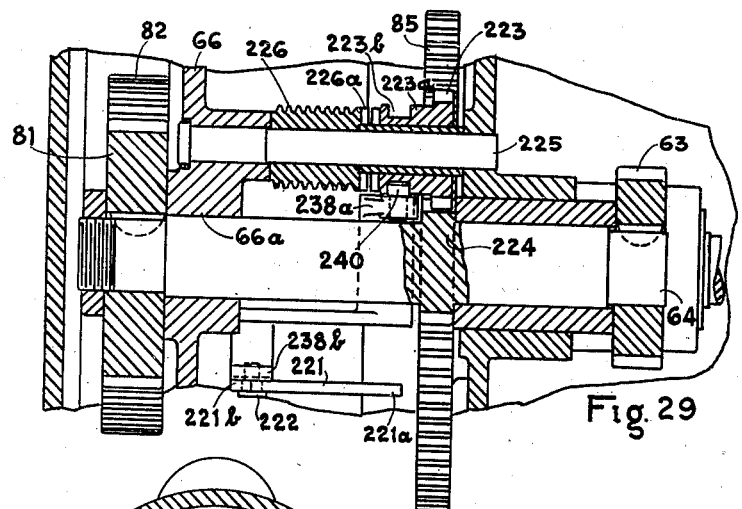
Fig. 29 is a horizontal section along line 29—29 of Fig. 11.

Referring to Fig. 3, a work piece A is shown in position between a pair of the opposed head and tail centers. Similar work pieces are inserted between each of the pairs of head and tail centers and are clamped by thrusting the tail spindles strongly in the direction of the head spindles, and by the means of driving dogs. After the work pieces are in place, a cycle of work movement is begun, the operator determining when the cycle shall begin by moving a suitable control part. The support 7 together with the work travels at a quick traverse rate to the right and having arrived at the extreme right of its travel the support 7 stops, the support 8 is moved upwardly on its pivot, to bring the work into the cutting plane and a slow feed of the support 7 toward the left starts. After the cutters have traveled sufficiently into the work, the feed automatically increases to a faster normal feed which is maintained for the balance of the travel to the left. It may here be explained that a cutter and especially one of the form required for milling deep grooves cuts much more smoothly, with less vibration and chatter and with less unbalanced strain tending to force the work from its supports or holders after it has entered into the work piece to the full depth of its cut, and it is to reduce the chatter and strain incidental to the brief period of starting into the cut that the slow feed mechanism is provided. Arriving at the limit of left travel the support 8 swings downwardly so that the cutters are clear of the work. If only one groove is to be machined in each piece the mechanism is automatically stopped in this position for loading. If additional grooves are to be machined the supports continue to move and a rapid traverse to the right begins. During the rapid traverse to the right, if more than one groove is to be cut, the work is indexed to make the second cut, and when at the end of this rapid traverse to the right, the support 8 swings up to a cutting position, the work has been turned to start a new cut, following which a slow feed begins to the left to be later changed to a faster or normal feed to the left, which continues until the second cut is completed. The support 8 then swings downwardly on its pivot so that the work clears the cutters, and if the work requires only two cuts to complete it, the movements stop in the down position for reloading new work pieces. If however additional cuts are required, the necessary other strokes are completed before the movements stop.

All the above is accomplished automatically, that is to say the movements are controlled from the power movement of the parts except reloading of the work and starting the mechanism to perform a new cycle, and by comparatively simple means which is to be described in detail. It is to be noted that the above cycle is merely representative and various changes may be effected therein. As suggested above, the indexing of the work pieces is optional and need not be performed at all, or if performed, the work may be indexed once or several times before the movements are stopped. It is also optional as to whether the slow feed is to be used. The mechanism whereby this is effected may be rendered inoperative in which case the feed stroke will start immediately at a normal feed rate. Both the length of cutting stroke and the rate of the normal feed are adjustable or variable to accommodate different work pieces. In addition, means are provided to slowly rotate the work pieces during their advance whereby a spiral groove as it is generally known, or more accurately speaking, a helical groove, may be cut in the work pieces each time the work is fed forward.

The above and other features of the mechanism provided will be more fully explained in connection with the description of the mechanism.

*Main clutch and drive to cutters*

A main drive shaft 12 (see Fig. 1) may be actuated from any convenient power source, such as an electric motor shown in part and denoted generally by the numeral 13 and supported by a bracket 14 from a main stationary support or column 1. In the drawing the motor is shown coupled to shaft 12 by the means of a conventional coupling generally denoted by the numeral 15. A pinion $12^a$ fixed with shaft 12 meshes with a gear 16 fixed upon a rotatable shaft 17 together with a pinion $16^a$, which meshes with a gear 18 freely rotatable and slidable on a shaft 19. A gear 20 is fixed on shaft 19 and the gears 18 and 20 are provided on their adjacent faces with complementary clutch teeth $18^a$ and $20^a$. The gear 18 may be moved in the one or the other direction thereby to engage or disengage the clutch teeth by the means of a hand lever 21, fixed on a pivot pin or shaft 22 and outside the column 1 at the left in a position to be readily grasped by the operator. Lever 21 is connected to shift gear 18 by the means of a lever 23 fixed with shaft 22 and a lever 24 pivoted on a shaft 25 and having a shoe 26 engaging the annular groove $18^b$ on the extended hub of the gear 18; the levers 24 and 23 being connected by the means of a rod 27 pivoted at its ends in the respective levers. Thus when hand lever 21 is moved in the one direction the clutch teeth $18^a$ and $20^a$ will engage, whereby the motor 13 will drive gear 20 and when moved in the other direction gear 20 and all parts connected to be driven therefrom will be idle, the clutch thus formed being a main clutch for stopping the movement of the entire machine except the several parts directly coupled to motor 13. This main clutch is generally denoted by the letter B, Fig. 1.

*Cutter support and drive*

Referring to Fig. 1, the gear 20 meshes with a gear 28 keyed on a shaft 29 and which meshes with gear 30 fixed on a shaft 31 upon which is slidably splined a unitary pair of gears $32^a$ and $32^b$ of different diameters, and adapted to be shifted in the one direction whereupon gear $32^a$ will engage and drive a gear $33^a$ or to be shifted in the other direction whereupon the gear $32^b$ will engage and drive a gear $33^b$. Gears $33^a$ and $33^b$ are fixed on a shaft 34, which may drive the spindle 2 by the means of the wide face pinion $33^c$ fixed on shaft 34 and the mating gear 35 fixed on the spindle 2. The gear pair $32^a$—$32^b$ may be shifted in either direction by the means of a hand lever 36 outside the column and fixed on a pivot pin or shaft 37 which extends inside the column and carries a lever 38 having a fork 39 pivoted therewith and engaging the faces of the gear 32$^b$.

Figure 2:
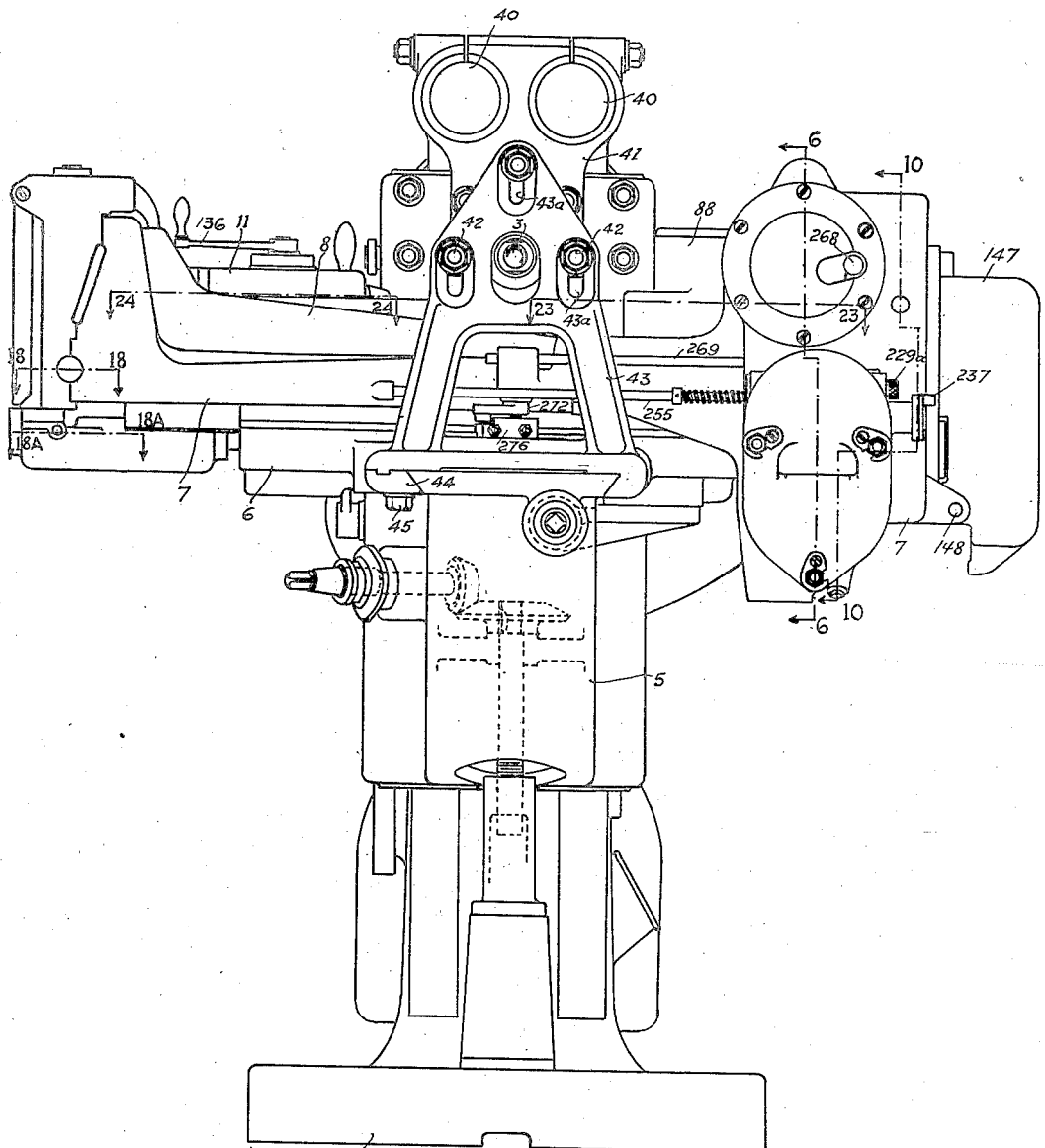
Fig. 2 is a front elevation of the complete machine.

A cutter or tool arbor 3 is provided with an end 3$^a$ fixed in the end of spindle 2 to be supported and driven thereby; and in turn supports and drives the several cutters 4 (see Fig. 3). The arbor and cutters are provided with supplementary supports in the form of a structure coacting with a plurality of overarms 40 and also with a drive supplementary to the drive through the arbor end 3$^a$. This support from the double overarms and the supplementary drive have been fully disclosed in a previous application Serial 12,254 filed February 28, 1925, and will not here be further described since the details thereof form no part of the present invention. A harness or brace 41 (see Fig. 2) is adjustably fixed with the supporting structure depending from overarms 40 by the means of bolts 42; the adjustment being provided by the means of the slotted bolt holes 43$^a$ and the brace 43 is clamped or fixed with a knee 5 by the means of a clamp member 44 which is tightened by the means of a bolt 45.

By the above described mechanism the arbor 3 and cutters 4 are provided with a very rigid support and a drive from the motor 13, the drive being capable of interruption by the means of the main clutch B. If driven the arbor may be selectively operated at different speeds according to the position of the gear pair consisting of gears 32$^a$ and 32$^b$. It is to be noted that the gear pair is merely representative of a great variety of speed change mechanisms for altering the speed of the arbor.

*Transmission for the movement of work support 7*

The work support 7 together with all the mechanism supported therefrom is slidable in the saddle 6 as previously noted. For power movement thereof, a transmission is provided as will now be described.

The shaft 29 (see Fig. 1) is extended toward the rear and carries a gear 46 fixed thereon which drives a gear 47 through idlers 48 and 49 rotatably supported in a case or housing 50 fixed at the rear of column 1. The gear 47 is fixed on a shaft 51 rotatably supported and having fixed on its front end the member 52 which is the driving member of an extensible universal joint shaft of well known construction and generally denoted in Fig. 1 by the numeral 53. A driven member 54 of joint shaft 53 is fixed on a shaft 55, see Figs. 6 and 8, rotatably supported from the work support 7. The gear 47 stands to the right of column 1 from which gear 46 is supported and the idler gears 48 and 49 are in fact larger than the relative proportions shown in Fig. 1, the showing of the idlers being conventional for the sake of clearness. By the above described mechanism shaft 53 is rotated at a constant rate whenever the main clutch B is engaged, and irrespective of the position of the slidable support 7 relative to column 1. At the front end of shaft 55 is fixed a bevel gear 56 meshing with a bevel gear 57 fixed on a shaft 58 (see Figs. 9 and 30) having suitable bearings in a case or housing 7$^a$, (see Figs. 6 and 3) fixed with or integral with the work support 7. A gear 59 fixed on shaft 58 meshes with and drives a gear 60 (see Figs. 8, 9 and 30) supported for independent rotation on a fixed stud 61. By the above described mechanism the gear 60 is rotated at a constant quick traverse rate whenever the main clutch B is engaged.

A spur gear 62 (see Fig. 6) is fixed on the front end of a shaft 55 and meshes with a gear 63 on a shaft 64 (Figs. 6, 8, 11, 12 and 29). A shaft 65 (Figs. 6, 10, 11, 12 and 30) is driven from shaft 64 by the means of feed change mechanism to be later described which is supported in a case or housing 66 (see Fig. 3 etc.) and which provides normal feed rate for the cutting travel of the work which may be changed to obtain a preferred rate and also provides, if desired, a relatively very slow starting rate whereby the work may travel at a rate considerably less than the normal feed rate until the cutters are well started into the cut. Fixed on the shaft 65 is a worm 67 (Figs. 9, 10 and 30) meshing with a worm wheel 68.

Figure 30:
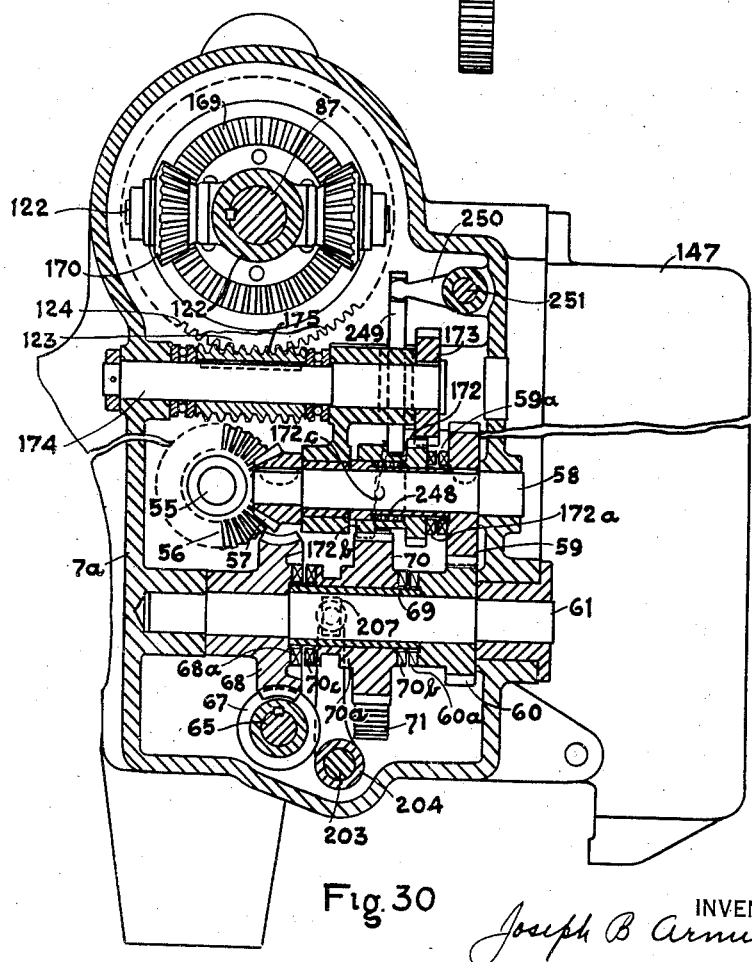
Fig. 30 is a developed section along line 30—30 of Fig. 10.
Figures 31, 32:
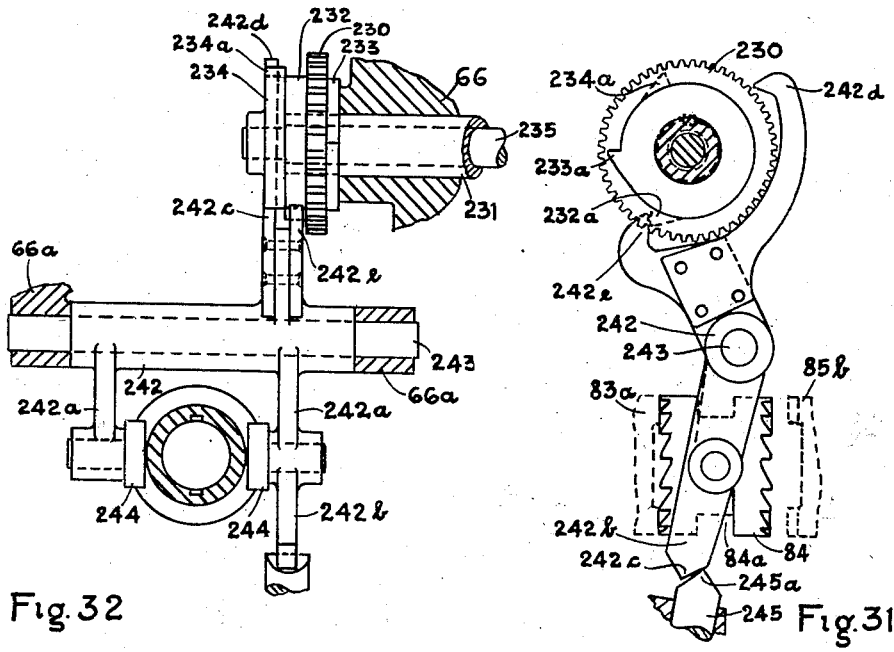

The worm wheel 68 is, by the above described mechanism given a continuous feed motion whenever the main clutch B is engaged and the relationship of the parts is such that the worm wheel 68 and the spur gear 60, which has been previously described as having a quick traverse movement, revolve in opposite directions. Wheel 68 is provided with clutch teeth 68$^a$ and gear 60 with clutch teeth 60$^a$ (Figs. 8, 9 and 30). The wheel and gear are spaced apart on the stud 61 by the means of a sleeve 69 and a clutch member 70$^a$ having fixed therewith a gear 70 freely rotatable on sleeve 69, is provided with clutch teeth 70$^b$ on the one end and clutch teeth 70$^c$ on the other end, the clutch teeth being respectively complementary to the teeth on wheel 68 and gear 60 and being adapted to engage with and be driven by the complementary teeth when the member 70$^a$ is shifted in the proper direction. Gear 70 meshes with an idler gear 71 (see particularly Fig. 8), suitably supported and which in turn meshes with a gear 72 fixed to revolve with a bevel gear 73 and with a supporting shaft 74. The bevel gear 73 meshes with a bevel gear 75, fixed to revolve with a spur gear 76 on the stud 77. Gear 76 meshes with a gear 78 fixed on the lead screw 79 (Figs. 1 and 8) which is journaled in a bearing 7$^c$ in the work support 7 but is prevented from axial movement therein, being restrained to move with the work support 7 in its movement relative to saddle 6.

By the above described mechanism screw 79 may be given a relatively slow feeding rotation in the one direction if the clutch teeth 70$^c$ are engaged with the complementary clutch teeth 68$^a$, or with a relatively fast quick traverse rotation in the opposite direction if the clutch teeth 70$^b$ are engaged with the complementary clutch teeth 60$^a$. The screw 79 is in threaded engagement with a nut 80 fixed in the saddle 6 and when the screw is rotated as described the work support is forced to travel in the one or the other direction in accordance with the direction of rotation of the screw. The relationship is such that when the screw is rotated from the engagement of clutch teeth 70$^c$ with clutch teeth 68$^a$, the resulting direction of movement of work support 7 is toward the left in Fig. 2 and at a feeding rate as previously described; and when the clutch teeth 70$^b$—60$^a$ are engaged the direction of movement of support 7 is toward the right in Fig. 2 and at a rapid traverse rate.

Feed change transmission

Transmission mechanism is interposed between the driving shaft 64 and the driven shaft 65 as previously noted, for the purpose of permitting the normal feed rate to be changed, and for the purpose of providing when desired a relatively very slow feed rate during a portion of the feed travel of work support 7, which will now be described.

The case or housing 66 is fixed upon the case or housing 7$^a$ (see Figs. 3—6—11—12 and 29) and is provided with a bearing 66$^a$ (Figs. 12 and 29) for the forward end of the extended shaft 64 upon which is removably fixed a feed change gear 81 (see Figs. 12 and 29) which meshes with a feed change gear 82 removably fixed on a short shaft 83 (Fig. 12) rotatably supported in housing 66 and provided on the end opposite the change gear end with an enlarged portion having clutch teeth 83$^a$. Shaft 83 is in axial alignment with the previously described shaft 65, which is extended forward at 65$^a$ and has slidably keyed upon it a clutch member 84 having clutch teeth 84$^a$ complementary to the clutch teeth 83$^a$ and adapted to engage therewith and be driven thereby when member 84 is moved in the proper direction, in which case shaft 65 will be operated through the change gears 81 and 82 and will transmit the rate detemined thereby to the worm wheel 68. The change gears 81 and 82 are reversible in their position in the train and also may be replaced by other gears of different ratio which also may be reversible, the gears 81 and 82 being in fact merely representative of a great variety of change gears of different ratio, which may be interchangeably and reversibly mounted on shafts 64 and 83 whereby a great variety of feed rates may be selectively available for driving the support 7 through the mechanism previously described.

The shaft 64 also has fixed upon it or integral therewith a gear 224 (Figs. 12 and 29) which meshes with a gear 85 having a stem or elongated hub 85$^a$ (Figs. 6 and 12) provided with a suitable bearing in the supporting housing and in axial alignment with shaft 65 which passes through an axial bore in the hub, the gear and shaft being independently rotatable. The gear 85 is provided with clutch teeth 85$^b$ (Fig. 12) suitably disposed to be engaged by complementary clutch teeth 84$^b$ on the clutch member 84 when the clutch member is shifted in the proper direction. When the member 84 is so shifted the shaft 65 will be driven through the gears 224 and 85 and will then drive the worm wheel 68 from which the support 7 may be driven by the mechanism previously described and since the driving gear 224 is comparatively very small and the driven gear 85 comparatively very large, the support movement resulting from such a drive will be at a comparatively very slow feed rate.

It will thus be seen that in accordance with the position of the clutch member 84 either a predetermined variable normal feed rate or a very slow alternative feed rate may be available to feed the support 7.

Support 8 and drop table mechanism for raising and lowering same

The numeral 8 as previously noted has been generally applied to an oscillating work support pivoted for movement about the axis of a shaft 87 (see Figs. 4, 6, 7, etc.). Several members including a head stock member 88 and a platform or table member 8$^a$ on which the tailstock 11 is slidably adjustable are pivoted together to move about this axis in order to drop the work pieces out of contact with the cutters during the quick return traverse stroke. Referring to Fig. 7, the bushings 89 and 90 are fixed in the support 7, and their outside diameters provide bearings upon which the member 88 is pivoted, the member 8$^a$ being rigidly fixed with member 88, or integral therewith. At its left end the part 8$^a$ is provided with bearings for a pin or shaft 91 having eccentric portions 91$^a$ (see Fig. 5). It is to be noted that the construction shown in Fig. 5 is at the right hand of Fig. 4 since Fig. 4 is a view taken from the rear. The eccentric portions of pin 91 form one bearing for the connecting rods 92 by which the left end of support 8$^a$ is raised and lowered, the other end of the connecting rods having a bearing on the eccentric portions 93$^a$, of a shaft 93 supported in the member 7 and which is power rotated as will be later described. The connecting rods 92 in combination with the eccentric portions 93ª on shaft 93 act to raise and lower the left end of member 8ª as the shaft 93 is rotated, and when the eccentric portions 93ª are in their upmost position, the member 8ª, upon which the work pieces are supported is in the working or cutting position. The distance through which the left end of piece 8ª is raised or lowered is determined by the throw or eccentricity of the portions 93ª which is sufficient to provide for the maximum contemplated depth of cut when the eccentrics are in their upward position while providing that the work shall clear the cutters to permit indexing when the eccentrics are in their down position. The support 8 together with the mechanism for raising and lowering same, constitutes in effect, a drop table mechanism whereby the work pieces may be alternately moved to a cutting plane and to a non-cutting plane of movement.

The depth of cut in the work pieces is determined by the adjustment of the knee 5 vertically on column 1 which bodily moves the work together with its supports toward or from the cutters, but in order to provide an adjustment whereby the depth of cut may be varied at the one end relative to the other, that is to say at different points in the work piece, the pin 91 is provided with the eccentric portions 91ª as previously noted, and the pin may be rotated to raise or lower the left end of the support 8 relative to the pivoted or right end, by the means of worm gear teeth 91ᵇ, cut in an enlarged portion of pin 91 and engaged by a worm or screw 94 suitably supported for rotation but fixed against axial movement in the part 8ª and having a shaft or shank fixed with the worm portion and provided with a squared portion 94ª to which a crank or wrench may be applied for rotating the worm. The pivot about which the support 8 swings is axially parallel with the cutter arbor, and the work pieces are arranged to be equally distant from the pivot axis, although this causes a peculiar arrangement relative to the slide 7. The arrangement is such that the described adjustment for varying the depth of cut at different points in the length of the work piece will be equally effective upon all work pieces on the several work centers which is very desirable since were it otherwise the axes of the various spindles could not be maintained in a plane parallel to the axis of the cutter arbor at the different points of adjustment, and each adjustment might then require cutters of different diameter for each work piece in order to obtain equal cut depth on all. Such an arrangement is also effective in that the cutter operating upon each work piece is withdrawn when the drop table operates in a direction vertical to the plane of cutter rotation and there can be no undesirable interference between the work piece and the cutter as the drop table mechanism operates.

A cover plate 95 is hinged at 96 (see Fig. 5A) to protect the mechanism from dust or chips while permitting free access to the squared end 94ª for purposes of adjustment. It may be noted that while for simplicity of drawings the bearings for the pin 91 are shown as bores in the end of part 8ª, in practice the bearings are provided with removable caps for the convenience of assembly of the pin.

To rotate the shaft 93 and thereby raise and lower the support 8, transmission mechanism is provided as follows. The shaft 55 has fixed thereon a helical gear 97 (see Fig. 6) meshing with a helical gear 98 fixed on a shaft 99 rotatably supported in the member 7 whereby shaft 99 is driven whenever shaft 55 is driven. At its left end shaft 99 is suitably supported and provided with a clutch member 100 keyed therewith (see Fig. 18) and supported in a bracket 101 fixed on support 7 and having clutch teeth 100ª. A sleeve 102 is freely rotatable on the shaft 99 and carries a gear 103 slidably keyed therewith. The gear 103 is provided with an extended hub having clutch teeth 103ª complementary to the clutch teeth 100ª and urged toward engagement therewith by a spring 104 housed in a recess or chamber provided between sleeve 102 and the bore of the gear. The complementary clutch teeth are normally held from engagement as will be later described but at a certain point in the operation of the device the restraining means will be withdrawn or rendered ineffective and the mating teeth will engage to drive gear 103 from the shaft 99. When so driven the gear 103 will drive a gear 105 with which it meshes and through shaft 106 will drive a worm 107 (Figs. 5, 5A and 18) engaged with a worm wheel 108 fixed on shaft 93. By the above mechanism the shaft 93 may be given a power rotation at intervals determined by the shifting of gear 103 which is shifted at predetermined intervals as will later be described.

*Work supporting spindles and drive mechanism therefor*

The work is supported and may be rotated from individual head spindles 9 (see Fig. 3) at the right hand end and from individual tail spindles 10 at the left hand end. In the present embodiment eight of each of these spindles provide for simultaneous operation upon eight work pieces.

The eight head spindles are similar in construction and only one will be described in detail. The numerals 9 refer generally to a spindle which consists of a number of parts as shown in Fig. 23 in which one of the head spindles is shown in section. Referring thereto, the spindle proper consists of the member 9ª having suitable bearings in the pivoted member 88, being rotatable therein but prevented from axial displacement relative thereto by the means of a thrust bearing 112 seated against a thrust face on member 88 and against which a shoulder on the spindle 9$^a$ reacts and a nut 109 in threaded engagement with spindle 9$^a$ and reacting through a thrust washer 110 against another thrust face on member 88. A center 111 is slidably but closely fitted in a suitable axial bore in spindle 9$^a$ and is provided with a suitable point or tapered portion 111$^a$ to engage with a suitable complementary recess provided in the work pieces A (see Fig. 28). A member 113 engaging a threaded bore in the spindle 9$^a$ and having a tapered bore provides a seat for a portion of the tapered point of the center 111 but permitting sufficient of the point to project for engaging the work piece. A flange 113$^a$ provides a face seating against a complementary face of the spindle 9$^a$. Washers (not shown) of suitable thickness may be interposed between the complementary faces or some of the material may be removed from one of the complementary faces whereby in their original adjustment the points of the centers 111 may be made to correspond in each of the several spindles, and at future times in case of damage to the points 111$^b$, the center 111 may be removed and replaced after correction with the work engaging point occupying exactly the same position, the member 113 acting as a gauge. Such construction has particular advantages as will be referred to later in connection with the work drivers. The centers 111 are thrust against the gauge member 113 and retained by the means of a thrust rod 114 loosely fitting in the spindle bore, thrust forward by the means of a thrust screw 115 and retained by the means of a lock screw 116, the screws each engaging a threaded portion of the bore. Each of the spindles 9$^a$ are provided with driving gears 117 fixed thereon and the eight gears 117 are engaged by four gears 118 (see Fig. 7) fixed upon the shafts 119 rotatably supported in the housing or member 88. The arrangement of the gears 118 is such that each gear 118 engages two of the gears 117 and thus drives two spindles 9$^a$ in the same direction whereby all the eight spindles are driven in the same direction by four driving gears. This is clearly shown in Fig. 7 where two of the underlying gears 117 are indicated meshing with one of the gears 118.

Each of the shafts 119 are provided with a bevel gear 120 meshing with bevel gears 121 fixed upon a shaft 87 having suitable bearings in the bushings 89 and 90. The location of the shaft 87 is thus on the pivot axis of the member 88 whereby the spindles may be driven irrespective of the pivoted movement of the member. Fixed upon shaft 87 is a differential driven member 122 (Figs. 6, 7 and 30) which may be actuated to drive shaft 87 from shaft 55 either from a spiral lead changing mechanism through the worm wheel 123 or from an indexing mechanism through the worm wheel 124 or from both mechanisms simultaneously. These mechanisms will be later described in detail.

The head spindles are each provided with driving means whereby the work pieces supported from the head centers may be rotated with the spindle. Referring to Figs. 23 and 28, a T slot 9$^b$ in each spindle has slidably fitted therein a driver dog 125, providing a slot or opening 125$^a$ in which a work piece A may be inserted, for support on the center 111 and when positioned for such support a screw or clamp member 126 threaded in the driver may be set up to rigidly engage the work piece A. The driver being slidable in the T slot will equalize the clamping pressure whereby in clamping no strain or pressure will be exerted tending to force the work piece from the center upon which it is supported. A variety of driver dogs may be used to suit different forms of work pieces.

The construction of the spindles with slidable or floating drivers, and with gauge means for the supporting centers or points as previously described is particularly important. The several center points of the different spindles are, by the construction shown, originally positioned and always maintained with all the points exactly equally spaced relative to the spiral or helix grooves cut in the work piece. Thus any number of work pieces may be finished in a first operation and subsequently replaced in the machine in any order with certainty that the axial location will be exactly as in the original operation, irrespective of which work spindle originally held the work piece. The drivers as here constructed will then, when tightened turn all such work pieces to the original position of rotation relative to the spindles, thus locating all work pieces for a second operation in precise relationship to the first operation. It is thus possible to rough out a quantity of work pieces and later in a second operation finish mill the same grooves. Or, by adjusting means later described in connection with the lead changing mechanism, the relative position of all the parts may be changed whereby the groove or form cut, on the second operation, may be spaced in a predetermined relationship to the first operation with equal convenience.

Tail spindles corresponding in number to the head spindles are provided, and are individually indicated in Fig. 3 by the numerals 10. Each of the tail spindles generally indicated by the numerals 10 consists of a number of parts and the several tail spindles being similar only one will be described in detail. The tail spindle proper is the member 10$^a$ (see Fig. 24) slidably rotatable at its one end in the bores 11$^a$ and 11$^b$ of the tailstock 11. At the other end it has slidably keyed thereon a sleeve 127 which is slidably rotatable in a bore 11ᶜ in the tailstock 11. In a central part of the spindle 10ᵃ has rigidly fixed upon it a gear 128. Between gear 128 and the sleeve 127 is a spring 129 which tends to thrust the gear 128 together with spindle 10ᵃ in the one direction and the sleeve 127 in the other direction. The sleeve 127 rests against a thrust bearing 130 and the thrust bearings of two spindles rest against an equalizing member 131 which floats on the spherical end of a screw 132 threaded in a plate 133 rigidly fastened to the tailstock 11 by the means of screws not shown, there being four equalizing members 131 and four plates 133 for the eight tail spindles.

A tail center 134 is fixed in a suitable taper bore in the work end of the spindle 11ᵃ by the means of a taper shank 134ᵃ and a tang 134ᵇ, this being an ordinary method of locating and driving centers of various kinds. The work end of the tail center is provided with a cone shaped depression 134ᶜ to suit the particular work pieces shown, and is gashed at suitable intervals to clear the cutters as at 134ᵈ. In practice the cone shaped depression is provided with serrations or minute teeth, not shown, radiating from the center whereby an improved driving contact is had with the work. The entire tailstock 11 is slidably adjustable on the member 8ᵃ toward and from the head centers for the purpose of accommodating work pieces of various lengths, being rigidly held in the various positions of relative adjustment by the means of a plurality of bolts 115ᵃ (see Fig. 3) having T heads engaging with a T slot 115ᵇ and a second plurality of T bolts 135 engaging a T slot 8ᵇ, all in the manner ordinarily employed for clamping adjustable members.

When the tailstock 11 is properly adjusted and work pieces are set between the respective head and tail centers the screws 132 which have previously been loosened to permit the work to be withdrawn are turned forward to thrust strongly against the work, the pressure being transmitted through the equalizers 131, the thrust bearings 130 and the sleeves 127, and the gears 128, which as the pressure becomes effective are caused to seat against the sleeve in spite of the spring 129 which tends to separate the gear and sleeve, and then through the spindles 10ᵃ and tail centers 134. The equalizers 131 tend to compensate for any slight difference in length of the work pieces supported from the two tail centers against which each equalizer member reacts. When it is desired to remove the work pieces the screws 132 are turned backward, although until further steps are taken the tail centers 134 still remain thrust forward against the work piece by the springs 129 and prevent the work piece from falling out. To withdraw the spindles one at a time four hand levers 136 (see Figs. 3—24—26) are each effective on two work spindles, whereby when turned in the one direction one of the work spindles will be pulled back in spite of the springs 129 and when turned in the other direction the other spindle will be drawn back. The means whereby this is accomplished is similar for the different levers and will be described for only one. Lever 136 is fixed on a rod or shaft 137 rotatable or pivoted in a member 138 fixed on the tailstock 11 and is provided with an enlarged head portion 137ᵃ having a plurality of pins 139, fixed therein. The enlarged downwardly projecting portions of the pins 139 are, in the normal relationship of the parts, positioned to just clear the faces of the gears 128 on the side toward the work, when the levers 136 are in the normal position as shown in Figs. 3 and 24. Should the lever be manually swung in the one direction one of the pins 139 will contact the face of a gear 128 and continued lever movement will thrust the gear together with the entire spindle and center, away from the work piece thereby freeing the work piece. Should the lever be swung in the other direction the other spindle will be moved in a similar manner. The clamping and releasing arrangement described is of advantage in that the clamp screws 132 each react on a plurality of spindles thereby decreasing the time required to clamp or to unclamp the work, while still permitting the work pieces to be individually retained by the springs 129 when removing and replacing work whereby it is unnecessary to insert or remove two work pieces at a time in order to prevent the one falling out while the other is being handled.

The tail spindles 11ᵃ are given a power movement corresponding to the power movement of the head spindles 9ᵃ, being positively geared to the head spindles by the following mechanism. Four shafts 140 (see Figs. 7, 23, 24, 25) underlie the head and tail spindles in such positions that the gears 141 fixed thereon (which are shown for two of the shafts in Fig. 23, but are provided for each shaft) will each mesh with the gears 117 on two of the head spindles 9ᵃ whereby the shafts 140 will each be positively driven from the spindles 9ᵃ. In the tailstock 11 each shaft 140 is provided with a gear 142, this being illustrated for one of the shafts in Figs. 24 and 25. The position of the shafts 140 is such that each gear 142 meshes with two of the gears 128 on the tail spindles 10ᵃ and the arrangement is such that provision is made for the previously described axial movement of the spindle 10ᵃ in the tailstock. The shafts 140 are rotatably supported in suitable bearings in both the head and the tailstock, being prevented by suitable means from axial movement relative to the headstock but are of sufficient length to permit of tailstock adjustment without disengaging from the gears 142 with which they are slidably splined as shown particularly in Fig. 25. By the described construction the work pieces are positively rotated from the head spindles 9$^a$ by the means of dogs 125 and are semipositively driven from the tail spindles 10$^a$ by the engagement of the cone point 134$^c$ of the tail center 134 with the end of the work pieces. A further purpose is served by the positive connection of the tail spindles, in that by this means the tail spindles always stand in an exact angular position relative to the head spindles and to other power operated parts of the machine whereby, when the work mounted on the centers 134 is raised to the cutters the clearance slots or grooves 134$^d$ which are provided in centers 134 are always correctly positioned so that the cutters may enter therein.

*Lead changing mechanism for work spindles*

When cutting spirals it is necessary that the work be given a rotary motion as it is advanced and for varying the lead, that is to say the advance of the spiral groove per turn of the work, it is customary to provide gearing connecting the screw or other work advancing means with the work spindle to rotate the latter in definite ratio with the former. In the present machine such a connecting train exists in the form of the previously described gearing connecting the shaft 74 (see Fig. 8) with the screw 79 together with a train now to be described connecting the shaft 74 with the shaft 87, and the gearing connecting the shaft 87 with the work spindles, which has already been described.

Shaft 74 (Figs. 8 and 15) is supported in the one end in a bushing or sleeve 143 fixed in member 7 and at its end a gear 144 is removably fixed. A swinging bracket member 145 is pivoted on the outside diameter of the sleeve 143, and may be clamped in any of its positions of pivoted adjustment by the means of several bolts 146 one of which is shown in detail in Fig. 15. Fig. 15 also illustrates a sectional development of the train, which is housed under a cover 147 (see Figs. 1 and 2) pivoted on the member 7 at 148 which may be swung down for the purpose of permitting access to the change gears of the train. In Fig. 17 is shown an elevation of the bracket 145, the holes for bolts 146 being slotted as at 145$^a$ to provide for the pivoted movement of the bracket. A sleeve 149 has a body portion adjustably fitting in a slot 145$^b$ in the bracket 145 and has an enlarged head portion 149$^a$ which is drawn solidly against a surface of the bracket by a nut 150 threaded on the sleeve whereby the sleeve is retained in any of its positions of adjustment in slot 145$^b$. Rotatably supported in sleeve 149 is a short shaft 151 which at the one end has removably fixed upon it a gear 152 meshing with gear 144, and at the other end has removably fixed upon it a gear 153. Gear 153 meshes with a gear 154 removably fixed on a sleeve 155 rotatable on a stud 156 fixed in the member 7, the gear and sleeve being held in place axially by the means of a washer 157 and a nut 158. Also fixed on the sleeve 155 is a gear 159 which meshes with a gear 160 rotatable on a shaft 161 but in operation positively connected therewith by a device permitting relative adjustment between the gear and shaft. This device in detail consists of the following parts. An index plate 162 fixed upon gear 160 is provided with a number of index plunger holes, spaced apart and at equal distance from the axis of the gear, one of these holes being shown at 162$^a$. Fixed upon the shaft 161 is member 163 carrying a member 164 rotatably mounted on a projecting hub of the member 163. The member 163 is provided with worm threads 163$^a$ on its periphery, engaged by a screw or worm 165 (see also Fig. 16) which is rotatably supported by but axially fixed against movement relative to the member 164 and having a projecting end 165$^a$ which is squared to receive a wrench or crank by the means of which it may be turned thereby to move the member 164 relative to the member 163. A plurality of bolts 166 having T heads engaging with a circular T slot 163$^b$ in the member 163 provide for clamping the members 163 and 164 rigidly in any of their positions of relative adjustment. The member 164 is provided with a spring pressed index plunger 167 adapted to be engaged with any one of the index holes 162$^a$ in the plate 162 and as the plunger is withdrawn from the one hole and moved to engage another, the member 164 together with member 163, shaft 161 and any parts connected therewith will be moved relative to the gear 160 and its connected parts. The adjustment thus provided is however relatively coarse and for other purposes a finer adjustment may be obtained by leaving the plunger 167 engaged in the index plate and adjusting the member 163 relative to the member 164 by the means of worm 165 as previously explained.

Fixed upon shaft 161 (Figs. 6 and 15) is a worm 168 engaging with the feed worm wheel 124 having fixed therewith a bevel gear 169 (see Figs. 6 and 7). The differential spider or frame 122 fixed on shaft 87 rotatably supports a plurality of bevel gears 170 meshing with the bevel gear 171 fixed on the index worm wheel 123. The index worm wheel is stationary except at intervals as will later be explained, and when it is stationary the arrangement shown will transmit the motion of the gear 124 to the shaft 87 unaffected by the feed worm gear connection with the index worm wheel. When the index worm wheel is operated by mechanism to be later described the motion of both worm wheels will be transmitted to the shaft 87, the result being that shaft 87 is moved by each worm wheel in accordance with the algebraic sum of the two motions.

Each of the gears 144, 152, 153, 154 (Fig. 15) is removable and may be replaced by other gears of different size. When one of the gears 144 or 152 is replaced by a gear of different size this requires that the center distance between shafts 74 and 151 be changed and it is for this reason that the shaft 151 is adjustably mounted as described in the bracket 145. When one of the gears 153 or 154 is to be changed this requires that the center distance between shafts 151 and stud 156 be changed and it is for this purpose that the bracket 145 is made to swing as described. The true relationship of the stud 156 is shown in Fig. 17, and it will be apparent that by loosening the screws 146 the bracket may swing to permit of a change in center distance of the shaft 151 and the stud 156. This arrangement constitutes a rate change device whereby the lead of the spiral to be cut on the work pieces may be varied over a wide range.

If the work pieces do not require that the grooves should be cut spiral, the train to the worm 168 is interrupted by removing one or all of the change gears 144, 152, 153 and 154. The worm 168 and wheel 124 are self locking so that even if such gears are removed the index mechanism operative through the worm wheel 123 will act as before on the shaft 87.

The adjustment provided as described by the index plunger 162 (Fig. 15) and associated parts and the relatively fine adjustment provided by the worm 165 and associated parts provide means whereby work pieces may be manually indexed independently of an automatic indexing mechanism later to be described, and whereby a cut or cuts to be made in the work pieces as a second operation may be spaced an exact distance from a cut or cuts previously made in the work pieces.

It will be noted that the gearing described constitutes a train connecting the support 7 with each of the several work spindles, the train being adapted to be power driven at an intermediate point, in this instance the shaft 74. The practice in spiral cutting machines having a single work spindle ordinarily is to drive the screw which advances the support, and transmit the power from the screw to the work spindles, but in this instance owing to the number of work spindles, great strain resulting in inaccuracy might be set up in the screw were this practice followed and the improved method herein shown has been devised for this and other reasons.

*Train for power indexing of work spindles*

A constant speed drive is provided for the power indexing of the work spindles. This train is driven from the shaft 55 through the bevel gears 56, 57, shaft 58 and gear 59 all previously described (see Figs. 9, 10 and 30). Gear 59 is provided on its face with clutch teeth 59$^a$ and slidably supported on shaft 58 is a gear 172 having complementary clutch teeth 172$^a$ adapted to engage the clutch teeth 59$^a$ when gear 172 is moved in the proper direction, or to disengage when the gear is moved in the other direction. Meshing with gear 172 is a gear 173 fixed on a shaft 174 upon which is also fixed a worm 175 which engages a worm wheel 123 freely rotatable on the shaft 87 (see Figs. 6 and 7) and having fixed therewith a bevel gear 171. Bevel gear 171 meshes with the previously described bevel gears 170 on the differential bracket or spider 122 which is fixed to the shaft 87 and when the clutch teeth 59$^a$ and 172$^a$ are engaged power will be transmitted through the train just described to the shaft 87 through worm wheel 123. Although the spider 122 is ordinarily moving under the influence of the worm wheel 124 as previously explained the motion of worm wheel 123 will be algebraically added to such other motion. In the case that clutch teeth 59$^a$ and 172$^a$ are disengaged the worm 175 and wheel 123 provide a self-locking arrangement which prevents the motion of worm wheel 124 from moving the worm wheel 123, while in case the train to the worm wheel 124 is interrupted worm 168 and wheel 124 are also self locking which prevents the worm wheel 123 from movement of worm wheel 124.

*Control devices in general*

Suitable control mechanism is provided for each of the previously described trains except the cutter drive train and arranged in such a manner that the movements set up by the trains are carried out in a properly timed sequence to perform the work movements in proper order. These control devices will now be described.

*Control for reciprocating support 7 and for raising support 8*

The support 7 reciprocates, being moved from right to left at a feed rate when the clutch teeth 70$^c$ are engaged to be driven from worm wheel 68 and being moved from left to right at a rapid traverse rate when the clutch teeth 70$^b$ are engaged to be driven from the gear 60 all as previously explained. Carried by a bracket 176 upon support 7 is a trip post 177 (see Figs. 3, 4, 18, 20) which thus reciprocates with the support 7 in saddle 6. Adjustably fixed on saddle 6 by the means of a T slot 6$^a$ and a T bolt 178 in the ordinary manner is a dog 179, having a portion 179$^a$ extending into the path of movement of a portion or projection 177$^a$ on post 177. In the movement of support 7 to the left, the dog is so adjusted that at the proper time, that is to say when the cut is finished it will contact the projection 177ª and turn the trip post upon its axis.

Post 177 is provided with gear teeth 177ᵇ engaging suitable rack teeth in a rod 180 slidably supported from the support 7. A projecting portion 180ª is fixed with rod 180 and is provided with an angular face 180ᵇ contacting a roll 181 pivoted in a lever 182 fixed on the one end of a short shaft 183. Fixed on the other end of shaft 183 is a lever 184 having an end portion 184ª engaging recesses 185ª (see Figs. 18 and 19) in a rod 185 which is slidably supported to extend on the one end into engagement with a groove 103ᵇ of special form in the extended hub of gear 103. The groove 103ᵇ is of such form that when the end of rod 185 is entered therein the clutch teeth 103ª will be withdrawn from clutch teeth 100ª as will be later explained but when the dog 179 strikes trip post 177 in the left hand movement of support 7, the pin 185 will, by the above described connecting mechanism be withdrawn from the groove 103ᵇ and as soon as this happens the gear 103 will be forced to the right in Fig. 18 by the means of the spring 104, thereby engaging the clutch teeth 103ª to be driven from the clutch member 100 and through mechanism previously described to drive the eccentric shaft 93 (see Fig. 5 etc.). The position of the eccentric shaft 93 when the table is moving to the left is always such that the support 8 is in the upward position of its pivoted movement, that is to say with the eccentric portion of shaft 93 in its most upward position, to bring the work into the cutting plane, therefore the movement of shaft 93 when started as above, will cause support 8 to start to move downwardly, which motion will continue until the eccentric shaft 93 has made one half of a revolution, and has brought support 8 to its downmost position to permit the indexing and rapid back traverse of the work pieces, after which the driving connection to shaft 93 will be interrupted as follows:

Fixed at the one end of shaft 93 is a cam member 186 (see Figs. 4, 5, 18, 21, 22) having a plurality of slots 186ª and 186ᵇ suitably positioned to be engaged by a portion 184ᵇ of an arm fixed upon the lever 184. The previously described movement of lever 184 withdrew the arm portion 184ᵇ from a position in one of the slots of member 186 where it had been left by a previous movement of shaft 93. As soon as shaft 93 starts to move the slot from which arm portion 184ᵇ has just been withdrawn moves out of register with the arm portion and during the revolution of shaft 93 the movement of the support is reversed as will later be described, thus moving the post 177 from contact with dog 179. The previously described movement of rod 180 when contacted by dog 179 was obviously to the right in Fig. 18, and immediately the dog is withdrawn from contact with the trip post portion 177ª a spring 187 acts to move the rod 180 to the left again until a collar 188 contacts a stop portion on bracket 176, at which time the angular face portion 180ᵇ has been moved away from contact with the roll 181. The pin 185 is urged to engage the groove 103ᵇ by the means of a spring 189 and except that it is now prevented by the contact of the arm portion 184ᵇ with the flat end face of member 186 the pin would immediately drop into the slot 103ᵇ. As member 186 is turned with shaft 93 the second slot therein is eventually in alignment with the arm portion 184ᵇ which can then drop into the second slot immediately permitting the end of pin 185 to enter slot 103ᵇ. The slot 103ᵇ at most portions is comparatively wide so that the pin may drop into the slot in spite of the fact that the slot has been shifted as the clutch member 100 was engaged. At one point however, the slot is provided with a cam portion 103ᶜ (see Fig. 19A) of suitable form such that the pin having engaged the slot at a wide slot portion will, during the continued revolution of the gear 103 withdraw the teeth 103ª from engagement with the member 100 thus interrupting the drive to shaft 93. The spacing of the slots 186ª and 186ᵇ in member 186 is such that the shaft 93 makes one half revolution before the arm portion 184ᵇ drops into a second slot, and almost immediately thereafter the drive to the shaft 93 is interrupted as described.

The reversal of movement of the support 7 as mentioned above has been effected automatically during the downward movement of support 8ª as follows.

Fixed on the end of the eccentric shaft 93 is a cam member 190 (see Figs. 18, 21, 22, etc.) having a cam portion 190ª adapted in the rotation of the shaft 93, to contact the end of a rod 191, which as will be described is so connected for movement with the clutch member 70ª (see Fig. 8 etc.) that when the clutch member is in the position effective to move support 7 to the left that is to say, when engaged to be driven from worm wheel 68, the end of rod 191 projects well into the path of movement of the cam portion 190ª, and as the shaft 93 continues to turn, the rod 191 is moved to the right in Fig. 18. Rod 191 is connected for movement with the rod 192 (Figs. 18, 20 and 35) by the means of a lever 193 pivoted on the member 183 but free to turn thereon. Pivoted in lever 193 is a shoe 194 engaging with a slot in the rod 191 and also a pivoted shoe 195 engaging with a slot in the rod 192 whereby movement of the rod 191 to the right moves the rod 192 to the right. The rod 192 extends along the rear of support 7 as more particularly shown in the rear view, Figs. 4 and 35, but it is to be remembered that the right hand movement of the rod will appear in Figs. 4 and 35 as a left hand movement since it is now viewed from the rear. At the left end in Fig. 4 rod 192 is supported in a bracket 196 as also shown in Figs. 6 and 35 and is provided with rack teeth meshing with the gear teeth of a segment 197 pivoted on a stud 198 together with a lever 199 fixed to move with the segment 197 and having a roller 200 pivoted on a pin 201 fixed in the lever 199. The lever 199 has portions 199$^a$ and 199$^b$ spaced apart to eventually contact a portion 202$^a$ of a lever 202 as the lever 199 is moved in the one or the other direction from the rod 192, the spacing apart of the portions 199$^a$ and 199$^b$ being such as to provide a lost motion device whereby the lever 199 in either direction of its movement will move a certain distance before it contacts and moves the lever 202. The lever 202 is fixed upon a shaft 203 rotatably supported in the support 7 and at the front end of which a fork 204 is fixed (see Figs. 9, 10, 30, 33, 34) and provided with pivoted shoes 207 and 208 engaging an annular groove 70$^d$ in the clutch member 70$^a$. The roller 200 contacts the angular or arrow shaped point of a plunger 205 guided for movement in the bracket 196 and pressed upwardly by a spring 206. As the lever 199 is moved in the one or the other direction the roller 200 rides over the point of the portion 205$^a$ and depresses the plunger 205 against the resistance of spring 206. Immediately the lever has been moved a sufficient amount to cause the roller to pass the point the spring pressed plunger is effective to continue the movement of lever 199 and the various parts connected therewith, and owing to the lost motion whereby lever 199 moves a considerable distance before it is effective to move lever 202 and fork 204 connected therewith, it will occur in either direction of the movement that the roller 200 has passed by the point of plunger 205 before the clutch member 70$^a$ has moved completely out of engagement. Hence when disengagement finally occurs the spring 206 will invariably continue the movement of the parts to move clutch member 70$^a$ to its opposite engagement immediately after being moved out of a given engagement, with certain exceptions as later described.

The movement of the rod 192 when brought about by the cam 190 as previously described tends to move the clutch member 70$^a$ from a position of engagement with the clutch teeth of feed worm wheel 68 and by the mechanism just described immediately this is accomplished the clutch member 70$^a$ is thrown into engagement with the clutch teeth of the gear 60 thus reversing the movement of the support 7 and changing its rate to a quick traverse.

Following the lowering of the support 8$^a$ and reversal of movement of the support 7 as described above, the support 7 is now traveling to the right and at a rapid traverse rate, the work being out of contact with the cutters because of the lowering of the support 8$^a$. In the course of the right hand movement, that is to say, as the support 7 approaches its extreme right-hand position, the post 177 will contact a dog 209 (see Figs. 4 and 18) adjustably retained on saddle 6 by the means of the T slot 6$^a$ by the means of the bolts 178$^a$ in a manner similar to the dog 179. A portion 209$^a$ of the dog is extended to strike a portion 177$^d$ of post 177 and thereby to turn the post on its axis as support 7 continues to move. The turning movement of the post is in the same direction as the post movement previously described from dog 179, because although the support is now moving in the opposite direction the contact by the respective dogs is on opposite sides of the axis of the post. Thus a movement of pin 185 will be set up precisely as before, and the clutch member 100 will as before be engaged until the shaft 93 has completed a half revolution. The previous half revolution having lowered the support 8, the present half revolution will now raise the support to its upmost position, where the cutters will be effective on the work when the movement of support 7 is reversed. There is this difference in the present action, whereas during the previous lowering of the support 8 the movement of support 7 has been reversed by the cam 190 in order to remove the posts 177 from contact with dog 178, thereby permitting pin 185 to interrupt the drive train to the shaft 93, in the present instance other means are used for the reversal of the table movement and to remove the post 177 from dog contact as follows. The post 177 as more particularly shown in Fig. 20 is forced to move up and down with the support 8$^a$, there being a bracket 210 fixed with the support and having a pivoted fork 211 engaging a slot or groove 177$^c$ in post 177 whereby the post may still turn under the influence of the dogs or spring 187. The portion 209$^a$ of dog 209 is of such position and dimensions that it will contact post 177 as described when the post is in its downward position of movement but as the post is lifted during the present half revolution of the shaft 93, it will rise above the dog, and before the shaft 93 has completed its present half revolution the post will have risen clear of the dog leaving the pin 185 free to drop into the cam groove 103$^b$, which occurs as soon as the slots in cam 186 will permit, thereby interrupting the revolution of shaft 93 as before, leaving the shaft and the member 8 in the upmost position.

At the proper time during the upward movement, the movement of support 7 to the right has been reversed to start the feed to the left again, by the following means. The dog 209 is provided with an upstanding portion 209ᵇ adapted to contact a member 212 fixed on reverse rod 192. The relationship of portion 177ᵈ and of member 212 and the relationship of dog portions 209ᵃ and 209ᵇ is such that at a suitable interval after the trip post contacts portion 209ᵃ of the dog, the member 212 will contact the portion 209ᵇ, whereupon the continued motion of the support 7 to the right shifts the rod 192 to the left and through previously described connecting mechanism this results in a disengagement of the clutch member 70ᵃ from the clutch teeth of the quick traverse gear 60 and engagement with the clutch teeth of the feed wheel 68 whereupon the support starts to move to the left and at a feed rate.

*Control for fast and slow feed rates*

The previously described train whereby a very slow movement of support 7 is effected, may be automatically rendered operative each time the support is reversed from right to left movement, that is to say at the start of each new feed stroke, whereby the first portion of the feed stroke may be at a relatively very slow rate which is later automatically changed to the normal feed rate, means being provided whereby the clutch member 84 (Figs. 12, 31 and 34) may be moved into a position of engagement to be driven from the slow motion feed gear 85 each time the clutch fork 204 is moved to engage feed wheel 68, and whereby if so moved after an interval it is shifted back into engagement to be driven from the normal feed gearing as follows:

Referring to Figs. 9, 14, 33 and 34, one of the arms of the lever 204 is provided with a contact member 208. A lever 213 fixed on a shaft 214 (see Figs. 12, 14, 33 and 34) has pivoted on a pin 215 a contact member 216 pressed against a stop pin 217 by the means of a plunger 218 against which a light spring 219 operates, thus tending to hold the member 216 against the stop pin in the position shown in Figs. 14 and 34. The relative position of the lever 204 and lever 213 in Fig. 14 corresponds to their position when clutch member 70ᵃ is engaged to be driven from feed wheel 68. When the clutch member is in its other position of driven engagement the contact member will stand in the position indicated at 208ᵃ, Fig. 14. In moving to the position at 208ᵃ the member 208 will shift the member 216 about the pivot 215, compressing the light spring 219 without moving the lever 213, movement of which is resisted by other spring means to be later described, but when moving from the position indicated at 208ᵃ to the lever position shown in Fig. 34 and by the full lines in Fig. 14 the form of the parts is such that the member 216 is forced aganist the stop pin 217 and the lever 213 must then raise to permit the movement of lever 204. At the opposite end of shaft 214 is fixed a lever 220 (Figs. 11, 12, 33 and 34) of peculiar shape that it may reach around the gear 85 without interference therewith. Lever 220 is provided with a contact portion 220ᵃ adapted to contact with and move a lever 221 pivoted on a pin 222 and having a contact portion 221ᵃ. Arranged to be controlled in part from the above mechanism and in part from a mechanism later to be described, is a power train for the shifting of the clutch member 84, including a gear 223 (Figs. 11, 12 and 29) meshing with the gear 224 to be driven thereby, and supported for rotation on a stud 225 upon which is also supported a worm 226 meshing with a worm wheel 227 (Figs. 11 and 12) fixed for rotation with a short shaft 228 in an axial bore of which a shaft 229 is slidably mounted to be driven thereby. Fixed upon or integral with shaft 229 is a gear 229ᵃ meshing with a gear 230 fixed on a hollow shaft or sleeve 231. The gear 230 has directly fixed therewith the cams 232 and 233 (Figs. 11, 12, 31, 32 and 33), and another cam 234 is also fixed to rotate with gear 230 but is adjustable in its angular relationship to the gear 230 and the other cams, being fixed on a shaft 235 rotatably adjustable in sleeve 231 (Fig. 11). To provide such adjustment and to determine the amount thereof, an enlarged head portion 235ᵃ (Fig. 11) of the shaft 235 is provided with a bore for a screw 236 and in the enlarged head portion 231ᵃ of the sleeve 231 are provided a series of threaded holes for the screw 236 as particularly illustrated in Fig. 13. To effect the angular adjustment mentioned the screw 236 is removed from one of the threaded holes and the shaft 235 is turned relative to sleeve 231 by the means of a handle or pin 237 until the screw may enter a different threaded hole providing the required relative position of the cams.

Figures 33, 34:
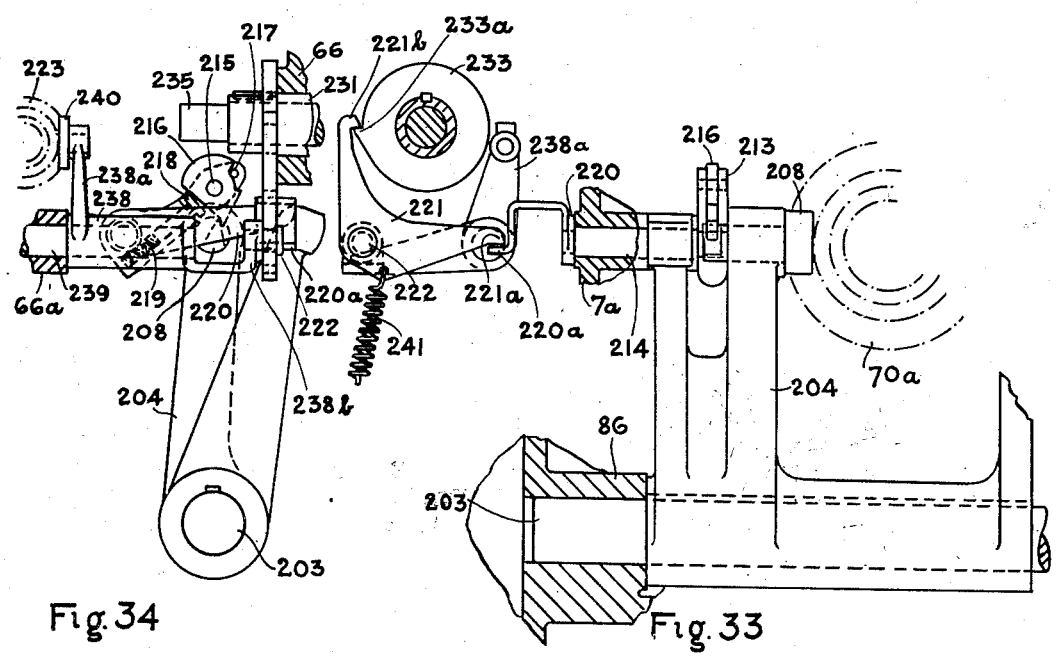

The worm 226 and the gear 223 are each freely rotatable on the stud 225 and are not connected for movement of the worm from the gear unless a clutch member 223ᵃ with which gear 223 is fixed, is shifted in the proper direction to engage the clutch teeth 226ᵃ on the end of the worm. The clutch member 223ᵃ may be shifted in either direction by the means of a lever arm 238ᵃ (Figs. 11, 12 and 29) of a lever 238 pivoted on a pin 120 239 which is fixed in an ear or lug 66ᵃ integral with or attached to the housing 66. The lever arm 238ᵃ carries a pivoted shoe 240 engaging an annular groove 223ᵇ in the clutch member 223ᵃ. The pivot pin 222, previously described, of lever 221 is carried by a second arm 238ᵇ of the lever 238 in such a position (see particularly Figs. 12 and 33) that a portion 221ᵇ of lever 221 will be contacted by a portion 233ᵃ of the cam 233 during the rotation of the cam. When this occurs the lever 221, together with the lever 238 will be moved against the resistance of a spring 241, and the clutch member 223ª, previously engaged with the clutch teeth 226ª of worm 226 will be disengaged and the parts will then stand in relative position as shown in Figs. 12 and 33. As previously described the shifting of clutch member 70ª (Figs. 9 and 30) to a feed position brings about an upward movement of the contact portion 220ª (Figs. 12 and 33) of the lever 220. The various parts are always in the position shown in Figs. 12 and 33, at the start of such movement of lever 220. The movement of lever 220 moves lever 221 until the portion 221ᵇ has been shifted out of engagement with the cam portion 233ª whereupon under the influence of spring 241 the entire lever 238 including arm 238ª is shifted in a direction to engage the clutch member 223ª with the worm clutch teeth 226ª, Figs. 12 and 29, whereupon the train previously described and the cams connected therewith will be moved. Shortly after this occurs and after the cam portion 233ª has rotated past lever portion 221ᵇ, the lever 204 reaches the full line position shown in Fig. 14 and lever 221 may swing back on its pivot pin to a position where the continued rotation of cam 233 will after one revolution of the cam and gear 230 cause cam portion 233ª to again engage lever portion 221ᵇ and thereby move the lever 238 (Figs. 11, 33 and 34) to disengage clutch member 223ª, thus bringing the mechanism of the clutch shifting train again to rest in the position shown in Figs. 12 and 33 but only after clutch 84 (Figs. 12, 31, and 32) has been shifted through the position of engagement with the slow feed clutch 85ᵇ and back to engagement with the normal feed clutch 83ª as will now be described. Almost immediately after the rotation of cams 232, 233, 234 is started as described, a portion 232ª of the cam 232 contacts with a portion 242ᵉ of a lever 242 pivoted on a stud or pin 243 fixed in housing 66ª (Figs. 11, 12, 31 and 32). Lever 242 is provided with arms 242ª in which are pivoted shoes 244 engaging with an annular groove 84ª in the clutch member 84. The engagement of the cam portion 232ª with the lever portion 242ᵉ disengages the clutch member 84 from engagement with the clutch teeth 83ª and shifts it a certain distance in the direction to engage the clutch teeth 85ᵇ of the slow motion gear 85, sufficient to cause the point of a cam portion 242ᶜ fixed on the arm 242ᵇ of lever 242 to pass over the arrow shaped point 245ª of a plunger 245 which is pressed by a spring 246, after which the plunger under the influence of the spring will act to quickly engage the clutch member 84 with clutch teeth 85ᵇ to be driven from the slow motion gear 85.

Summarizing the action of the above mechanism, it may be stated that in the movement of the lever 204 to engage the reverse clutch member 70ⁿ in the feed side, the clutch member 223ª may be caused to engage and drive the power train for shifting the clutch member 84 from a position of engagement with the normal feed clutch in the direction to engage the slow feed clutch, following which the plunger 245 will quickly shift clutch member 84 into full engagement with the slow feed clutch.

To disengage the member 84 from the slow feed clutch and re-engage it for normal feed after a predetermined interval the following mechanism is provided. The cam 234 is provided with a contact portion 234ª (Figs. 11, 12, 31 and 32). The described movement of lever 242 to engage member 84 with the slow feed shifts a portion 242ᵈ of an arm of lever 242 into the path of movement of the cam portion 234ª which in the revolution of the cam will then eventually contact portion 242ᵈ. The relationship of the parts is such that when this occurs the continued motion of the cam portion 234ª will disengage clutch member 84 from the slow feed drive and will shift the member a certain distance toward engagement with the normal feed clutch teeth 83ª. This shifting movement will be sufficient to move the cam point 242ᶜ of lever 242 past the point of the plunger 245 following which the spring pressed plunger will act to quickly complete the shifting of the clutch 84. This will occur before the clutch member 223ª is disengaged as previously described, and after the disengagement of the clutch member 223ª the parts will again stand in the position shown in Fig. 12 ready to repeat the cycle of shifting to slow feed and back to normal feed when the clutch member 70ª is again shifted to the feed position. As previously stated the cams 232 and 233 are fixed together and the portions 232 and 233ª are positioned so that a predetermined interval (although very small) will elapse after the clutch 223ª is engaged before the clutch 84 is shifted to slow feed engagement. The cam 234 however is adjustable in its relation to cams 232 and 233 as previously explained and the interval between slow feed engagement and the re-engagement of normal feed is therefore variable to satisfy different conditions or work pieces, although re-engagement of the normal feed must take place before the gear 230 which drives the cams has completed its revolution since after completing one revolution the driving train for the gear 230 is interrupted as previously described. The driving train to the gear 230 is of constant speed, being driven from shaft 55 as described, and the elements of the train are chosen to give gear 230 a time interval for one revolution sufficient to provide for maximum requirements of the slow feed interval.

The slow feed causes a loss of time and is not necessary under all conditions, therefore means have been provided whereby the automatic mechanism for causing a slow feed may be disconnected until again required, in which case the clutch member 84 remains engaged with clutch teeth 83ᵃ and the feed will start at a normal rate which will continue throughout the feed stroke. To permit of this, the shaft 229 (Fig. 11) is slidable, together with the gear 229ᵃ as previously noted and may be shifted into a position disengaging the gear 229ᵃ from gear 230, a handle portion 229ᵇ projecting from the housing 66 for this purpose. Detent grooves 229ᶜ are positioned to be engaged by a spring pressed ball 247 to respectively define the engaged and disengaged positions. If the gears are disengaged while the clutch member 229 is in either position of its driven engagement the clutch member will remain in such position until the gears are again engaged to render the shifting cams operative.

*Control for indexing train*

Mechanism is provided for causing an indexing of the work spindles during each quick traverse stroke. During the quick traverse movement of support 7 to return the work to a starting position relative to the cutters the support 8 is in the down position and the work is out of contact with the cutters as previously explained. The train whereby the shaft 87 may be power operated at intervals for the power indexing has previously been described. The gear 172 and clutch teeth 172ᵃ (see Figs. 9 and 10) form portions fixed or integral with a clutch member 172ᵇ which is urged toward engagement to be driven from the clutch teeth 59ᵃ on gear 59 by the means of a spring 248. The clutch member 172ᵇ is normally retained in a position of disengagement by the means of a pin 249, the lower end of which engages with a cam groove 172ᶜ in clutch member 172ᵇ. At the upper end a slot 249ᵃ of the pin 249 is engaged by a lever 250 fixed on a pivot pin 251 which is suitably supported for oscillation. Also fixed on pin 251 is a gear segment 252 engaging with a gear segment 253 pivoted to turn freely on a pivot pin 254 and having fixed upon or integral therewith a lever arm 253ᵃ projecting to be contacted by a rod 255 suitably supported, but normally prevented from contacting the arm 253ᵃ by the means of a spring 256. Rod 255 is extended to provide an end 255ᵃ (see Figs. 5 and 5A) adjacent a cam 257 fixed to revolve with the worm wheel 108 and shaft 93. A contact portion 257ᵃ of the cam 257 will, once for every revolution of shaft 93 contact the end 255ᵃ and force the rod 255 to the right in Fig. 9 against the resistance of spring 256 and to actuate lever 253ᵃ whereupon the connecting mechanism described will be moved to lift the rod 249 out of engagement with the groove 172ᶜ in clutch member 172ᵇ permitting spring 248 to force the clutch member into driven engagement with clutch teeth 59ᵃ. The position of cam 257 relative to the eccentric portions of shaft 93 is such that this will occur just before the shaft 93 reaches the position corresponding to the extreme down position of the work pieces. An arm 252ᵃ is fixed for movement with segment 252 and has a portion 252ᵇ adapted to engage with either of a plurality of slots 258ᵃ of an index plate 258 fixed to revolve with the worm wheel 123 (see Figs. 7, 9, 10). A second arm 259 is pivoted on the pin 251 but is not connected for movement with the arm 252ᵃ except that a member 259ᵃ fixed on the arm 259 extends over the arm 252ᵃ whereby the arm 259 is raised out of engagement with the slot 258ᵃ whenever the arm 252ᵃ is so moved but the arm 252ᵃ is free to re-engage the slot independently of the arm 259, which may thus re-engage at a later period. The arm 252ᵃ is pressed to engage the slots 258ᵃ by a spring 260ᵃ, acting through plunger 261ᵃ and arm 259 is pressed to engage the slots by a spring 260ᵇ acting through a plunger 262ᵇ. It will be seen that when the segment 252 is moved as described to lift the pin 249 and engage clutch member 172ᵇ the arm 252ᵃ is pulled out of engagement with slot 258ᵃ, carrying with it the arm 259. The engagement of clutch member 172ᵇ immediately starts the revolution of worm gear 123 and although the cam portion 257ᵃ almost immediately passes the point 255ᵃ of rod 255 the pin 249 may not immediately re-engage the cam groove 172ᶜ to disengage clutch member 172ᵇ although urged in that direction by the springs 260ᵃ and 260ᵇ because the arms 252ᵃ and 259 now contact the periphery of index plate 258. When the index plate has turned sufficiently so that another index slot 258ᵃ is presented to the portion 252ᵇ of arm 252ᵃ this arm may drop into the slot and the pin 249 will then drop into engagement with the cam groove 172ᶜ. Cam groove 172ᶜ is formed similar to the cam groove 103ᵇ (see Fig. 19A) that is to say with a wide portion into which the pin 249 may drop during the revolution of the clutch member 172ᵇ and with a projecting portion formed to react against the pin once the pin is engaged in the slot and to withdraw the clutch member from engagement. It is for the reason that a certain time must elapse for the withdrawing of the clutch member that the arm 252ᵃ is made narrow in the portion 252ᵇ whereby it will permit the pin 249 to engage the cam groove 172ᶜ sufficiently before the slot 258ᵃ is in a position to engage with arm 259 to allow for the withdrawal of the clutch member, since the portion 259ᵃ of arm 259 fits closely in the slot 258ᵃ and after it engages no further motion of gear 123 or index plate 258 may take place. The lever 259 locates the index plate 258 for the accurate indexing of the work pieces, and therefore must fit closely in the slot, although a certain degree of variation in the time of clutch disengagement is provided by the tapered form of the slot and lever.

It is to be noted that the index plate 258 here shown is provided with two slots or index notches. Plate 258 is removable and may be replaced by another plate providing a different number of notches, whereby three or more cuts may be accurately spaced in the work pieces, or may be replaced by a plate having no notches in which case no indexing will take place and the movement may be stopped after each feed stroke as will be described.

Final trip or stop

The mechanism for reciprocating and for vertical movement of the workpieces has been described for continuous operation and unless other mechanism were provided the movements thus far described would continue in proper sequence indefinitely. It is desirable, however, that after all the required cuts have been completed in the work pieces the work movement should stop as an indication to the operator that new work pieces should be loaded, and for other reasons.

Fixed with the cam 258 is a cam 262 (see Figs. 9 and 10) having a raised portion 262$^a$. A lever 263 pivoted on the pin 254 is provided with arms 263$^a$ and 263$^b$ between which a lever 264 is pivotally supported on a pin 265 fixed in the arms. The lever 264 carries at the one arm thereof a plunger 266 normally urged forward by a spring 267 to a position to be contacted at its end 266$^a$ by the cam portion 262$^a$ once per revolution of the cam, but which may be withdrawn from such contacting position by the means of a handle 268 fixed on the end of the plunger and which also limits the forward movement caused from spring 267. Another arm of the lever 264 is provided with a contact portion 264$^a$ positioned to be contacted by an end portion 269$^a$ of a rod 269 (see Figs. 9 and 9A). Rod 269 is supported in the housing at the one end for contact with portion 264$^a$ and at the other end projects to be supported in a bracket or lug 7$^b$ on the support 7. The rod is provided with rack teeth 269$^b$ engaged by a segment 270 fixed on a shaft or pivot pin 271 in the lug 7$^b$ and at the lower end the pin 271 has fixed upon it a lever 272 provided with a roller 273 pivoted on a pin 274. Adjustably fixed on the saddle 6 by the means of a T slot 6$^b$ and T bolts 275$^a$ and 275$^b$ is a dog 276 having an angular face 276$^a$ adapted to contact roll 273 and move lever 272 and rod 269 during the movement of support 7. The time relative to the movement of support 7 at which such movement will take place is determined by the predetermined position of adjustment of the dog 276, which is ordinarily so positioned that the movement will occur at nearly the extreme end of the right hand or quick traverse movement of support 7. Since the lever 264 is freely pivoted in the lever 263 movement of lever 264 from the movement of the rod 269, which thus occurs near the end of each quick traverse stroke, will not affect to move the lever 263 unless the cam portion 262$^a$ is in a position to act as an abutment or thrust block for the other end of lever 264. But if the index cam has completed its revolution, that is to say if all the grooves to be cut in the work pieces are finished, the parts will then stand in the position shown in Fig. 9 and the movement of rod 269 will be transmitted to the lever 263. An arm of lever 263 carries a contact portion 263$^c$ in the plane of movement of a contact portion 204$^a$ on an arm 204$^b$ fixed with the lever 204. At the time that the dog 276 acts the support 7 is traveling at a quick traverse rate, that is to say the clutch member 70$^a$ is in the position of engagement to be driven from quick traverse gear 60. The movement of lever 263 from dog 276 moves the portion 263$^c$ which, reacting against the portion 204$^a$ withdraws the clutch member from engagement but does not move it sufficiently to cause the roller 200 to pass over the point of plunger 205, and the spring 206 will still be urging re-engagement with the quick traverse clutch. Thus the member 70$^a$ will be restrained in a neutral position from engagement in either direction and since all movement of the work is either directly set up or controlled from motion transmitted through the clutch member 70$^a$, the work movement will stop.

The action above described leaves the work in its down position and near the finish of its quick traverse stroke, that is to say at near the extreme right of the travel of support 7, which is the most convenient position for removal and replacement of work pieces. To further facilitate such replacement the knee 5 could be dropped down or the saddle 6 could be moved but ordinarily this is not required. Having replaced the finished with fresh work pieces, in order to start the work movement the operator grasps the handle 268 (Figs. 2, 9 and 10) and withdraws the plunger 266 out of contact with the cam portion 262$^a$, when the quick traverse engagement of clutch member 70$^a$ will immediately take place since such engagement is being urged by the plunger 205 as previously noted, and since the lever 264 is then free to swing about its pivot pin to permit lever 263 to swing and remove portion 263$^c$ from interference with the portion 204$^a$. The remainder of the quick traverse stroke then takes place, followed by reversal, etc., as herewith described. The plunger 266 may be immediately released since the point 266$^a$ will merely ride over the side of cam 262 and in the rotation of the cam will be forced by spring 267 into position to be again contacted and moved to the position shown in Fig. 9.

It will be noted that the work movement could not be directly tripped from cam 262, nor can it be directly tripped from the movement of support 7 since each may several times arrive at the desired tripping position before the work is finished, but by the trip means shown the work may reciprocate until all the grooves or slots are machined and then will be tripped or stopped.

In the case that only one groove is to be cut in the work pieces an index plate 258 having only one notch is to be used, in which case the work movement is stopped near the end of each quick traverse stroke.

Hand adjustment of support 109

The screw 79 (see Fig. 8) is provided with a clutch member 277 having clutch teeth 277$^a$ which may be engaged by complementary teeth in a hand crank (not shown) for the purpose of adjusting the support 7. This cannot be done while the clutch member 70$^a$ is engaged in either direction and if disengaged by the dog 276 at the end of the cycle of work movement, a manual movement of the support might move dog 276 from contact in which case the clutch member 70$^a$ would immediately re-engage in the quick traverse clutch direction. To prevent this and thereby permit of hand movement or adjustment means are provided for holding the clutch member in a neutral position as follows:

A plurality of plungers 278$^a$, 278$^b$, (see Figs. 6, 8, 27) are slidable in the bracket 279 and are provided with angular faces positioned to engage on opposite sides of the lever 202 when the plungers are moved forward, and to position the lever in a position corresponding to the disengaged or neutral position of clutch member 70$^a$ which is connected for movement therewith as previously described. The plungers are normally urged in a direction to disengage from the lever 202 by the means of a spring 280 which thrusts against a sleeve 281 guided to slide in bracket 279 and having an enlarged head which engages at opposite sides with suitable slots in the plungers as shown in Fig. 27. An eccentric sleeve 282 pivoted on pin 283 is provided with a handle 282$^a$ whereby it may be turned to cause the plungers to be thrust forward into engagement with lever 202 or may be turned in the other direction when spring 280 will cause their disengagement. In Fig. 27 the parts are shown in a position preventing engagement of clutch member 70$^a$, but in the other views they are shown in the position permitting power movement of the work.

It is to be noted that in the drawings the position of the parts in some of the views does not correspond to a position in the cycle of movement as for the same or other parts in other views. This is for the purpose of clearness and best description and the proper relationship of the parts has been fully described.

The invention embodied herein is capable of embodiment in a number of different forms, and certain parts of the mechanism here shown and for which invention is claimed are capable of performing their function in machines quite dissimilar in their complete result and purpose from the present machine, and it is to be understood that it is desired to protect the invention in all of its aspects as defined in the accompanying claims and in all equivalents which are within the spirit and scope thereof.

I claim:

1. In a milling machine the combination of a rotatable tool spindle, a first movable support; transmission mechanism for said spindle and support including a screw for support movement, mechanism connecting said spindle and said screw for simultaneous rotation, and a reverser member operative on said screw; control mechanism including a trip operative in one position of support movement and having motion transmitting connections to move said reverser member in one direction and a trip operative in another position of support movement and having motion transmitting connections to move said reverser member in the opposite direction; a second support movable to effect a relative movement between said tool spindle and said first support in a direction transverse to the movement of said first support, a transmission train connected with said second support and including a clutch member operative to control the movement of said second support, and trip elements having motion transmitting connections movable to establish movement of said clutch member in accordance with the movement of said first support.

2. In a device of the nature disclosed, the combination of a rotatable cutter spindle, a rotatable work spindle, transmission mechanism for simultaneously rotating both said spindles and for reciprocatory bodily relative movement thereof in a plurality of mutually transverse paths, and control mechanism for said transmission including trip parts adjustable for changing the length of said movement in one of said paths and simultaneously correspondingly altering the time of movement in the other path.

3. In a device of the nature disclosed, the combination of a tool spindle and a work spindle having reciprocatory relative movement in each of a plurality of mutually transverse paths, clutch controlled transmission mechanism for said spindle movement in each path, and power operable control mechanism including means for shifting the clutches of said transmission in an order productive of alternately opposite spindle movement in each path and alternately in the different paths.

4. In a device of the nature disclosed, the combination of a rotatable spindle, a support, mechanism connecting said spindle and said support for simultaneous spindle rotation and support movement, a transmission train connectible with said mechanism including elements shiftable for changing both the rate and direction of train motion whereby said support and spindle are moved in one direction at a feed rate and in the other direction at a quick transverse rate, and control means for shifting some of said elements including trip members having motion transmitting connection therewith and a plurality of adjustable dogs respectively adapted to contact and move a trip member during opposite directions of movement of said support.

5. In a milling machine, the combination of a movable support, transmission mechanism for movement thereof in opposite directions in each of a plurality of paths of movement, and control mechanism for said transmission mechanism including a plurality of dog members, each effective to change the support movement in both paths and each adjustable to determine when such movement will take place.

6. In a milling machine having a tool support and a work support, the combination of transmission and control mechanism whereby one of said supports may be moved in a cycle including alternate feed and quick transverse movements, other transmission mechanism adapted to materially reduce the rate of feed movement, and control mechanism for rendering said other transmission operative at the beginning of each feed movement of the movable support and for limiting its operation to a comparatively minor part of such feed movement.

7. In a milling machine having a tool support and a work support the combination of transmission and control mechanism whereby one of said supports may be moved alternately in opposite direction respectively at materially different rates, other transmission mechanism adapted to materially reduce the rate of support movement in one only of said directions, and control mechanism for rendering said other transmission mechanism operative at the beginning of each support movement in the last mentioned direction and limiting its operation to a comparatively minor portion of the support movement in that direction.

8. In a machine tool, the combination of a movable work support, a rotatable work driver supported therefrom, a mechanism connected between said support and driver for driver rotation simultaneous with support movement, transmission mechanism for establishing a forward feed movement of said support at a predetermined relatively slow feed rate, other transmission mechanism for materially reducing the feed rate, and control mechanism effective to render operative the last named transmission for a predetermined interval and subsequently render operative the other transmission, whereby the first portion of the feed movement will be at a rate materially less than a later portion.

9. In a machine tool having a reciprocable work support pivoted for other movement transverse to the path of its reciprocatory motion, the combination of a plurality of transmission trains respectively connectible for support movement in the one or the other of the transverse paths and each including a clutch member movable to connect the respective trains with said support, and control mechanism for the movement of the clutch member in the train for the reciprocation of said support including motion transmitting members actuated for control movement from the other of said trains.

10. In a machine tool having a work support movable in a plurality of transverse paths, the combination of a plurality of transmission trains for support movement in the respective paths, the one train including a clutch member shiftable in opposite directions to change the direction of support movement, and control mechanism for the shifting of said clutch member including motion transmitting members actuated for control movement from one of said trains to shift said clutch member in the one direction and motion transmitting members actuated for control movement from the other of said trains to shift said clutch member in the other direction.

11. In a machine tool the combination of a work support having reciprocatory movement and other movement transverse thereto, transmission mechanism connectible to move said support in said transverse movement, and control means for said transmission mechanism including a trip part movable in accordance with the reciprocatory movement of said support to connect said transmission and a trip part movable from said transmission for disconnection thereof.

12. In a drop table mechanism for a machine tool support having a reciprocatory movement the combination of an eccentric shaft progressively movable through half revolutions to alternately raise and lower said support, a transmission mechanism connectible with said shaft, control mechanism therefor to disconnect said transmission when said shaft has completed a half revolution, and other control mechanisms including a plurality of trip parts respectively effective to connect said transmission when the support reaches the opposite ends of its reciprocatory movement.

13. In a device for machining helical grooves in work pieces the combination of a movable support, a head center and a tail center each rotatably supported from said movable support, mechanism connecting said support with one of said centers for the simultaneous movement of said support and rotation of the center, said mechanism including means for the manual adjustment of said center without the movement of said support, and a train connecting the one with the other center whereby each will be equally adjusted in the operation of said adjusting means.

14. In a device for machining helical grooves in work pieces the combination of a reciprocatory support, a head center and a tail center each rotatably supported therefrom, and transmission mechanism connecting each of said centers for rotation in accordance with the reciprocatory movement of said support.

15. In a mechanism of the nature disclosed, the combination of a reciprocable support, a head center and a tail center each rotatably supported from said support, power mechanism for reciprocation of said support, and transmission mechanism including a transmission shaft connected to be driven from said power mechanism and connected for rotative movement with each of said centers.

16. In a device for machining helical grooves in work pieces, the combination of a reciprocatory support, a plurality of head centers and a plurality of tail centers each rotatably supported from said support, and transmission mechanism connecting each of said head and tail centers for movement with said support.

17. In a machine tool having a cutter and a rotatable work spindle bodily movable to a position where work pieces supported therefrom are clear of said cutter, the combination of an index plate having notches and connected for rotation with said work spindle, a power train connectible to rotate said index plate in a step by step movement, and control means for said train including a trip device operable during said bodily movement of the spindle to connect said train and a trip device operable from a notch in said index plate to disconnect said train.

18. In a machine tool having a cutter and a rotatable work spindle bodily movable through a space wherein work pieces supported therefrom will not be contacted by said cutter when the spindle is rotated, the combination of an index plate having a notch and connected for rotation with said work spindle, a power train connectible to rotate said index plate, and control means for said train having a portion movable in accordance with a portion of said bodily movement to engage said train and having another portion operable in accordance with the rotation of said notch to disengage said train.

19. In a device for machining helical grooves in work pieces the combination of a work spindle rotatably supported and bodily movable in the direction of its axis, a power train connected to simultaneously rotate and bodily move said spindle, and another power train simultaneously connectible to said spindle to index the spindle at intervals.

20. In a device for machining helical grooves in work pieces the combination of a work spindle rotatably supported and bodily movable in the direction of its axis, a power train connected to simultaneously rotate and bodily move said spindle, and another power train simultaneously connectible to said spindle at intervals for providing additional rotation thereof, the last named train being ineffective to bodily move said spindle, whereby the spindle may be rotated for indexing without affecting its position of bodily movement.

21. In a device for machining helical grooves in work pieces the combination of a work spindle rotatably supported and bodily movable in the direction of its axis, a power train connected to simultaneously rotate and bodily move said spindle, and a plurality of means for rotating said spindle to alter its position of rotation relative to its position of bodily movement, one of said means including a power index train connectible with said spindle at intervals and simultaneously with the other train, and another of said means including a manually operable adjusting device included in the first named power train.

22. In a device for machining helical grooves in work pieces the combination of a work spindle rotatably supported and bodily movably in a plurality of paths one of which is in the direction of its axis and the other of which is transverse thereto, a power train connected to simultaneously rotate and bodily move the spindle in the direction of its axis, a second power train connectible at intervals to bodily move said spindle in the other path a power index train connectible at intervals simultaneously with one of said other trains to rotate said spindle a predetermined angular distance, and a control device for connecting the index train including a trip member deriving control motion from said second train.

23. In a machine tool including a reciprocatory support and a plurality of revolving work spindles supported therefrom, the combination of a shaft connected for the actuation of said support, another shaft connected for the actuation of said work spindles, a transmission train connecting said shafts, and a power train connected with said transmission train at a point intermediate said shafts.

24. In a mechanism of the nature disclosed, the combination of a rotatable tool spindle, a work spindle rotatably supported and bodily movable in a direction forming an angle with a plane at right angles to the axis of said tool spindle, and means for guiding a bodily movement of said work spindle in a direction transverse to the first named bodily movement thereof, said means including a member pivoted on an axis parallel with said tool spindle.

25. In a mechanism of the nature disclosed, the combination of a rotatable tool spindle, a plurality of work spindles each rotatably supported from a member slidably guided for movement in a direction forming an angle with a plane at right angles to the axis of said tool spindle, and means for adjusting said work spindles in a direction transverse to said movement including a member pivoted on an axis parallel with said tool spindle; the axes of said work spindles each being located in a single plane parallel to the axis of movement of the pivoted member.

26. In a device for machining helical grooves in work pieces the combination of a rotatable work spindle, a movable support; a train connecting said spindle and said support including a shaft, a bevel gear rotatable on said shaft, a bracket fixed on said shaft, a bevel gear rotatably supported from said bracket and meshing with the first named bevel gear; and another train having a driving connection with the last named bevel gear for the indexing of said work spindle.

27. In a device for machining helical grooves in work pieces the combination of a rotatable work spindle, a drive shaft therefor, a bracket fixed on said shaft, a bevel gear rotatably supported from said bracket, and a plurality of driving trains for said bevel gear and each including a bevel gear meshed with the first named bevel gear and a worm and wheel in driving relationship thereto whereby either train may actuate said shaft but neither train may actuate the other.

28. In a device of the nature disclosed the combination of a drop table mechanism including an eccentric shaft operable in step by step motion through half revolutions, an index mechanism including a power train, and control mechanism for said power train including a train engaging portion movable in unison with the revolution of said shaft, whereby said index mechanism is rendered operative only when said shaft reaches a predetermined position of rotation.

29. The combination with a drop table mechanism adapted for relative movement of a work piece and a cutter to a cutting and a non-cutting position, of a power indexing mechanism, and timing means for establishing power movement of said power indexing mechanism including a portion movable in unison with said drop table mechanism, whereby the indexing mechanism will be rendered operative only at a certain position of the movement of the drop table mechanism.

30. In a milling machine having a movable support, the combination of a feed transmission having branch lines one of which includes a rate change mechanism and the other of which includes elements productive of relatively slow movement, said feed transmission including a clutch member shiftable in opposite directions for connecting with one or the other of said branch lines, a quick traverse transmission, a train connectible for movement of said support and including a clutch member shiftable in opposite directions to connect with the one or the other of said transmissions, and control means operative to shift each of said clutch members in each direction.

31. In a milling machine having a movable work support the combination of transmission mechanism therefor including feed and quick traverse clutch elements and a clutch member shiftable in the one direction to engage said feed element and in the other direction to engage said quick traverse element, said transmission also including a slow feed clutch element and a normal feed clutch element and a clutch member shiftable in the one direction to engage said slow feed clutch element and in the other direction to engage said normal feed clutch element, control mechanism operative to first shift the last named clutch member in the direction to engage the slow feed element and later to shift it in the opposite direction, and other control mechanism operative to cause the operation of the first named control mechanism when the first named clutch member is shifted to engage said feed element.

32. In a milling machine as specified in claim 31 the combination of additional control mechanism including a member shiftable to two positions respectively to cause said other control mechanism to be effective and ineffective.

33. In a milling machine as specified in claim 31, the combination of additional control mechanism including a plurality of elements relatively adjustable for determining the interval to elapse between the shifting of the last named clutch member in a direction to engage the slow feed element and its later shifting in the opposite direction.

34. In a machine tool having a support movable in a plurality of transverse paths and a transmission train for the movement thereof in each path, each of said trains including a shiftable clutch member, the combination of control means for shifting said clutch members, including for each clutch member elements connected therewith to shift the clutch member from motion derived through the other train.

35. In a milling machine the combination of a head center and a tail center each rotatably supported from a movable support, a transmission train connecting said support with one of said centers for simultaneous support movement and center rotation, and a train connecting the one with the other center whereby each center will be equally rotated.

36. A milling machine as specified in claim 35, in which the first named train includes rate change elements.

37. In a device for machining helical grooves in work pieces the combination of a plurality of work spindles each rotatable and bodily movable in an axial direction, a rate change mechanism, transmission mechanism connecting said rate change mechanism with each of said spindles for rotation thereof, a screw for the bodily movement of said spindles, a train connecting said rate change mechanism with said screw, and power means connectible to drive said train at a point intermediate said screw and said rate change mechanism.

38. In a device for machining helical grooves in work pieces the combination of a work spindle rotatable and bodily movable in an axial direction, a drop table mechanism for the movement of said work spindle in another direction and including a pivoted support, and a transmission train for simultaneous rotation and bodily movement of said spindle including a shaft axially coinciding with the axis of the support pivot.

39. In a device for machining helical grooves in work pieces the combination of a pivoted support, a plurality of rotatable work spindles supported therefrom, a reciprocatory member supporting said pivoted support, and a transmission mechanism connected to move said member and to rotate each of said work spindles, including a shaft axially coinciding with the axis of the pivot of said support.

40. In a device for machining grooves in work pieces the combination of a rotatable work spindle, a support therefor, transmission mechanism for reciprocating said support including a clutch member shiftable in opposite directions to engage with oppositely rotating power members, means for indexing said spindle including a part rotatable therewith; and control means for said clutch including a portion movable with the reciprocation of said support, another portion movable from the rotation of said part, and a part movable into a position preventing engagement of said clutch member in one of said directions and movable from the combined movement of both of said portions.

41. In a device for the machining of grooves in work pieces the combination of a rotatable work spindle and transmission and control mechanism therefor including mechanism for axial reciprocation and for rotatable indexing thereof, a power train connectible to actuate said transmission and control mechanism; and a motion interrupting device associated with said power train including a portion movable with the reciprocation of said work spindle, a portion rotatable with said work spindle, and a member associated with each of said portions to be moved thereby only when both of said portions are in a certain position of their movement.

42. In a transmission and control mechanism for a machine tool work spindle, the combination of means for alternate axial reciprocation and rotatable indexing of said spindle, a power train connectible to actuate said means; and a motion interrupting mechanism associated with said train including a first portion movable when said spindle reaches a certain position in its reciprocatory movement, a second portion movable when said spindle reaches a certain position in its indexing movement, and another portion movable only when said first and second portions have both been moved, said motion interrupting mechanism being operative only from the movement of said other portion.

43. In a milling machine the combination of a rotatable work spindle, a first support therefor adapted for bodily movement together with said work spindle in a path of movement parallel with the spindle axis, a second support for said spindle and adapted for bodily movement together with said spindle in a path transverse to the spindle axis, transmission mechanism for rotatably indexing said spindle at intervals, transmission and control mechanism for alternate movement of said second support in opposite directions and associated with said first transmission to move the second support in the one direction when the first support is at the one end of its reciprocatory movement and in the other direction when the first support is at the other end of its movement, and control mechanism for the indexing transmission operable in accordance with the movement of the second support in one only of its opposite directions of movement.

44. In a machine for cutting spirals, the combination of a plurality of rotatable and axially parallel work spindles, a support therefor and reciprocable in a direction parallel with the axes of said work spindles, a transmission train connecting both said spindles to said support to establish predetermined positions of spindle rotation as the support is moved, a plurality of removable work supporting and locating parts respectively associated with the different spindles and each having a work contacting surface adapted for work location in the axial spindle direction and another surface in predetermined relationship thereto, a plurality of gauge elements respectively associated with the respective spindles and each having a contact surface adapted to contact with said other surface of one of said parts whereby to locate the work contacting surface of said part in predetermined position in an axial spindle direction, and a plurality of drivers respectively associated with the respective spindles and adapted for work location in a predetermined rotational position; whereby to predetermine the location of work pieces relative both to the rotational position of the supporting spindle and to the position of said movable support.

45. A machine as specified in claim 44 in which said transmission train includes means for simultaneously adjusting the rotational position of both said spindles relative to a given position of said support.

46. In a machine for simultaneously cutting spiral grooves in a plurality of work pieces, the combination of a plurality of rotatable work spindles, a common movable support therefor, transmission mechanism connecting both said spindles to said support to establish predetermined positions of rotation of each spindle in accordance with the movement of said support and relative to the instantaneous positions of rotation of the other spindle, means associated with each spindle for positioning work pieces supported thereby in the same axial position relative to said support, means associated with each spindle for positioning work pieces supported thereby in the same position of rotation relative to the other spindle, and means associated with said transmission train for simultaneously equally altering the rotative position of each spindle relative to a given position of said support.

47. In a machine tool, the combination of a plurality of work spindles, a removable center for each spindle and having a cone shaped work supporting and locating point, and a gauge element for each spindle having a contact portion adapted to be contacted by a surface portion of one of said points, whereby to predetermine for each spindle the relative position of said center.

48. In a machine tool, the combination of a plurality of work spindles, removable work supporting and locating parts associated with said work spindles and each having a work contacting surface and another surface in predetermined relationship thereto, and a plurality of gauge elements respectively associated with the respective spindles and each having a contact surface adapted to contact with said other surface of one of said parts, whereby to predetermine the relative position of said part and spindle.

49. In a milling machine having a movable support, the combination of a transmission mechanism therefor including a power source, a first train connected with said source and terminating in a first member, a second train connected with said source and terminating in a second member, said second train including a part shiftable to change the rate of said second member while said source is maintained at a constant rate, an element connected with said support for movement thereof, and clutch means shiftable for connecting said element alternatively with said first or second member; together with control means including power operable devices for shifting both said part and said clutch means.

50. In a milling machine, the combination of a rotatable tool spindle, a work support movable in a path transverse to the axis of said spindle, a transmission for said spindle including in the order recited a power source, a spindle rate changer and said spindle, a feed train including shiftable feed rate change means, a rapid traverse train, said trains being each connected with said transmission to be driven from between said power source and said spindle rate changer and alternatively connectible for the movement of said support, and power means for shifting said feed rate change means at a predetermined position in the movement of said support.

51. In a milling machine, the combination of a rotatable cutter spindle, a cutter fixed therewith, a support movable in a path transverse to the axis of said spindle and adapted to support a work piece, a spindle train including in the order recited a power source, a spindle rate changer and said spindle, a feed transmission for actuating said support during a period when said cutter is operating on said work piece and including a driving element positioned in said spindle train at a point between said power source and said spindle rate changer and a feed rate changer driven from said element and shiftable to change the feed rate of said support, a relatively fast transmission for actuating said support during another period when said cutter is inoperative on said work piece, and a power operated control device for shifting said feed rate changer to materially change the feed rate during the first mentioned period of support movement.

52. In a milling machine, the combination of a rotatable cutter spindle, a cutter fixed therewith, a work support movable in a path transverse to the axis of said spindle, a spindle train including in the order recited a power source, a spindle rate changer and said spindle, a forward feed mechanism for actuating said support during a period of work and cutter contact and including a driving element positioned in said spindle train at a point between said power source and said spindle rate changer and a feed rate changer driven from said element and selectively shiftable for different feed rates, and a power operated control device for shifting said feed rate changer during said period of work and cutter contact.

In witness whereof I hereto affix my signature.

JOSEPH B. ARMITAGE.